United States Patent
Dinan et al.

(10) Patent No.: US 11,677,839 B2
(45) Date of Patent: Jun. 13, 2023

(54) AUTOMATIC COALESCING OF GPU-INITIATED NETWORK COMMUNICATION

(71) Applicant: NVIDIA Corporation, Santa Clara, CA (US)

(72) Inventors: James Dinan, Sharon, MA (US); Akhil Langer, Savoy, IL (US); Sreeram Potluri, Milpitas, CA (US)

(73) Assignee: NVIDIA Corporation, Santa Clara, CA (US)

( * ) Notice: Subject to any disclaimer, the term of this patent is extended or adjusted under 35 U.S.C. 154(b) by 28 days.

(21) Appl. No.: 17/351,002

(22) Filed: Jun. 17, 2021

(65) Prior Publication Data

US 2022/0407920 A1 Dec. 22, 2022

(51) Int. Cl.
*H04L 67/141* (2022.01)
*H04L 67/104* (2022.01)
*H04L 67/12* (2022.01)

(52) U.S. Cl.
CPC .......... *H04L 67/141* (2013.01); *H04L 67/104* (2013.01); *H04L 67/12* (2013.01)

(58) Field of Classification Search
CPC ...... H04L 67/141; H04L 67/104; H04L 67/12
See application file for complete search history.

(56) References Cited

U.S. PATENT DOCUMENTS

| | | | | |
|---|---|---|---|---|
| 7,904,965 B1* | 3/2011 | Patsenker | ............. | G06F 21/552 726/28 |
| 9,461,833 B1* | 10/2016 | Marra | ................. | H04L 12/1813 |
| 9,946,666 B2* | 4/2018 | Heinrich | ................. | G06F 12/00 |
| 2014/0372456 A1* | 12/2014 | Merrill | ...................... | G06F 7/22 707/752 |
| 2019/0206018 A1* | 7/2019 | Khodakovsky | ....... | G06T 15/005 |
| 2020/0111247 A1* | 4/2020 | Heggelund | ........... | G06T 15/405 |

* cited by examiner

*Primary Examiner* — Sm A Rahman
(74) *Attorney, Agent, or Firm* — Lowenstein Sandler LLP

(57) ABSTRACT

Apparatuses, systems, and techniques are directed to automatic coalescing of GPU-initiated network communications. In one method, a communication engine receives, from a shared memory application executing on a first graphics processing unit (GPU), a first communication request assigned to or having a second GPU as a destination to be processed. The communication engine determines that the first communication request satisfies a coalescing criterion and stores the first communication request in association with a group of requests that have a common property. The communication engine coalesces the group of requests into a coalesced request and transports the coalesced request to the second GPU over a network.

20 Claims, 14 Drawing Sheets

AUTOMATIC COALESCING OF GPU-INITIATED NETWORK COMMUNICATION

STATEMENT REGARDING FEDERALLY SPONSORED RESEARCH OR DEVELOPMENT

This invention was made with government support under Agreement H98230-16-3-0001 awarded by U.S. Department of Defense (DoD). The government has certain rights in the invention.

TECHNICAL FIELD

At least one embodiment pertains to processing resources used to perform and facilitate network communication. For example, at least one embodiment pertains to technology for automatic coalescing of GPU-initiated network communication.

BACKGROUND

Data movement requests initiated by graphics processing unit (GPU) threads are typically fine-grain requests. For example, a GPU thread typically initiates a communication request (e.g., put/get/atomic requests) for a single data element. These communication requests can be sent between distributed GPUs over peer-to-peer (P2P) connections or network connections. Communication requests with small payloads can be transmitted efficiently over P2P connections. However, communication requests with small payloads sent over a network between GPUs can result in low network efficiency and poor performance.

BRIEF DESCRIPTION OF DRAWINGS

Various embodiments in accordance with the present disclosure will be described with reference to the drawings, in which.

DETAILED DESCRIPTION

Figure 1:
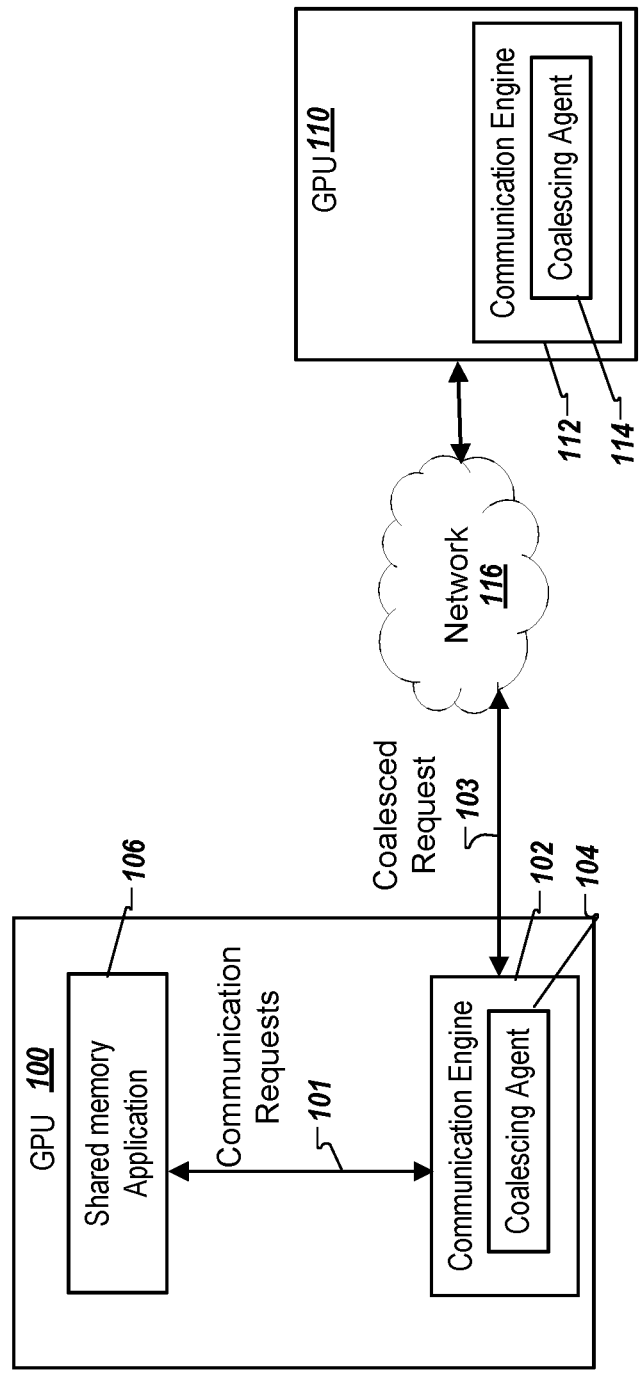
FIG. 1 is a network diagram of a GPU having a communication engine with a coalescing agent, in accordance with at least some embodiments.

As described above, data movement requests between distributed GPUs over a network can have smaller payloads that result in low network efficiency and poor performance. Some GPU architectures can include coalescing mechanisms to combine multiple data transfer requests (e.g., load/store operations) into a single request that can be transmitted efficiently via a P2P link (e.g., NVLink). When data transfers are performed via a network (e.g., InfiniBand or Ethernet), these coalescing mechanisms are not leveraged, resulting in low network efficiency and poor performance. For example, one solution performs automatic warp-level coalescing using software techniques to detect requests originating from multiple threads in a warp (also referred to as a group of threads) and coalesces these requests. While this technique effectively detects requests for coalescing, the resulting packet sizes are still typically 8 B*32 Threads=256 B data payloads, which are still inefficient for transfer over modern high-speed networks. The warp-level coalescing can only coalesce requests associated with contiguous memory locations.

Aspects and embodiments of the present disclosure address these and other challenges by providing a coalescing agent (software or hardware logic) in a communication engine that analyzes communication requests horizontally across multiple groups of threads (warps or cooperative thread arrays (CTAs)), as well as vertically across multiple requests issued by each thread, including requests associated with non-contiguous memory locations, before transporting the communication requests over a network. Aspects and embodiments of the present disclosure can achieve a greater degree of coalescing than prior approaches.

In at least one embodiment, the communication engine can use a GPU companion kernel that services both fine-grain communication requests (e.g., shared memory requests such as NVSHEM requests) for direct P2P data transfers (e.g., NVLink) and communication requests for network transport. The direct P2P transfer requests bypass the coalescing agent and are issued directly on the P2P link since the P2P link already provides good efficiency for small data transfers. The coalescing agent processes the network transfer requests before network transport since they cannot be serviced using direct, P2P transfers. In at least one embodiment, for communication requests over the network, the coalescing agent stores the communication requests in request queues to be analyzed for coalescing before being sent over the network. In at least one embodiment, a communication engine with a coalescing agent receives, from a shared memory application executing on a first GPU, a first communication request initially assigned to (be processed by) a second GPU. The communication engine determines that the first communication request satisfies a coalescing criterion and stores the first communication request in association with a group of requests that have a common property. The coalescing agent determines that a timer associated with the group of requests expires or a size of the group satisfies a group size criterion and coalesces the group of requests into a coalesced request. The communication engine transports the coalesced request to the second GPU over a network.

Aspects and embodiments of the present disclosure can analyze communication requests at a much broader scope (e.g., across multiple warps/CTAs) and across multiple requests issued by a single thread and coalesces communication requests having a common property before transporting over a network. Aspects and embodiments of the present disclosure can coalesce communication requests associated with noncontiguous memory locations.

FIG. 1 is a network diagram of a GPU 100 having a communication engine 102 with a coalescing agent 104, in accordance with at least some embodiments. The GPU 100 can be used to perform various operations, including speech recognition, object recognition, or any inferencing operations involving machine learning. In some embodiments, GPU 100 includes multiple cores, and each core is capable of executing multiple threads. Each core may run multiple threads concurrently (e.g., in parallel). In some embodiments, threads may have access to registers. Registers may be thread-specific registers with access to a register restricted to a respective thread. Additionally, shared registers may be accessed by all threads of the core. In some embodiments, a core may include a scheduler to distribute computational tasks and processes among different threads of a core. A dispatch unit may implement scheduled tasks on appropriate threads using correct private registers and shared registers.

In some embodiments, the GPU 100 may have a (high-speed) cache, access to which may be shared by multiple cores. Furthermore, the GPU 100 can be associated with a GPU memory where the GPU 100 may store intermediate and/or final results (outputs) of various computations performed by the GPU 100. After completing a particular task, the GPU 100 may move the output to (main) memory. In some embodiments, the CPU may execute processes involving serial computational tasks (assigned by one of the pipeline engines). In contrast, the GPU 100 may execute tasks (such as multiplication of inputs of a neural node by weights and adding biases) that are amenable to parallel processing. In some embodiments, a respective engine of the pipeline (e.g., an inference engine) may determine which processes managed by the respective engine are to be executed on the GPU 100 and which processes are to be executed on a CPU (not illustrated in FIG. 1). In some embodiments, the CPU may determine which processes are to be executed on GPU 100 and which processes are to be executed on the CPU.

In at least one embodiment, as illustrated in FIG. 1, the GPU 100 can execute a shared memory application 106. There are instances where the GPU 100 needs to communicate with a second GPU 110. To communicate with the second GPU 110, the GPU 100 sends communication requests 101 to the communication engine 102, which includes a coalescing agent 104. The coalescing agent 104 can analyze communication requests horizontally across a single thread, across a group of thread, across multiple groups of threads (warps or CTAs), as well as vertically across multiple requests issued by each thread, including requests associated with non-contiguous memory locations, before transporting the communication requests 101 over a network 116. The coalescing agent 104 can achieve a greater degree of coalescing than prior approaches to perform warp-level coalescing for communication requests associated with contiguous memory locations.

During operation, the communication engine 102 can receive a communication request initially assigned to and/or having the second GPU 110 as a destination for processing. The communication engine 102 determines whether the first communication request satisfies a coalescing criterion. For example, the communication engine 102 can determine whether the first communication request satisfies a request size criterion. The request size criterion can be a threshold size of requests that do not need coalescing. If the first communication request is less than the threshold size, then the communication engine 102 determines that the first communication request satisfies the request size criterion. Alternatively, the communication engine 102 can determine whether the first communication request satisfies a latency criterion. In at least one embodiment, the latency criterion can be set to allow coalescing so long as the coalesced communication request still meets a specified latency requirement. Alternatively, the communication engine 102 can determine whether the first communication request satisfies a P2P connectivity criterion. In at least one embodiment, the P2P connectivity criterion can require that the communication request be sent via a network connection and not a P2P connection between the GPU 100 and the second GPU 110. If the first communication request needs to be sent via the P2P connection, the first communication request should not be coalesced and can fail to satisfy the P2P connectivity criterion. In at least one embodiment, the communication engine 102 can determine which P2P connections are available and determine whether the communication requests 101 can reach their respective destinations over the P2P connections.

In at least one embodiment, responsive to a determination that the first communication request satisfies the coalescing criterion, the coalescing agent 104 stores the first communication request in association with a group of requests where each request has a common property. In at least one embodiment, the coalescing agent 104 can store the first communication request in an associative data structure where the first request is appended to the group of requests that have the common property. In at least one embodiment, the common property is the same type of operation (e.g., read, write, or atomic operation). In at least one embodiment, the common property is the same network destination (e.g., the same memory or network address). In at least one embodiment, the common property is the same GPU destination. In at least one embodiment, the common property is adjacent memory locations (e.g., adjacent memory locations at which data should be read according to communication requests 101 or to which data should be written according to communication requests 101). Alternatively, other common properties can be used to group communication requests 101 into a coalesced request 103 for efficient transport over the network 116.

In at least one embodiment, the coalescing agent 104 can determine whether a timer associated with the group of requests expires. In at least one embodiment, the coalescing agent 104 can determine whether a size of the group of requests satisfies a group size criterion. The group size criterion can be a minimum size desired for requests being transported over a network 116. Alternatively, the group size criterion can be specified as a threshold size that needs to be satisfied for coalescing. In at least one embodiment, in response to a determination that the timer expires or the size of the group of requests satisfies the group size criterion, the coalescing agent 104 coalesces the group of requests into a coalesced request 103. In at least one embodiment, the coalescing agent 104 generates a data layout description in a data payload of the coalesced request 103 to indicate how to uncoalesce the coalesced request 103. The communication engine 102 transports the coalesced request 103 to the second GPU 110 over the network 116.

In at least one embodiment, the communication engine 102 (and/or the coalescing agent 104) is implemented as a software communication engine in the GPU 100. In at least one embodiment, the communication engine 102 (and/or the coalescing agent 104) is implemented in a first kernel in the GPU 100, and the shared memory application 106 is executed in a second kernel in the GPU 100. The first kernel can be considered a companion kernel to the second kernel. In at least one embodiment, the communication engine 102 (and/or the coalescing agent 104) is implemented as a software communication engine in a third GPU (not illustrated in FIG. 1) coupled to the GPU 100. In another embodiment, as described in more detail below, the communication engine 102 (and/or the coalescing agent 104) is implemented as hardware logic in a hardware offload circuit coupled to the GPU 100. In another embodiment, as described in more detail below, the communication engine 102 (and/or the coalescing agent 104) is implemented as a software communication engine in a CPU operatively coupled to the GPU 100. Alternatively, the communication engine 102 (and/or the coalescing agent 104) is implemented as software within the GPU 100 executing the shared memory application 106. In at least one embodiment, the coalescing agent 104 is a software-based coalescing agent that aggregates multiple GPU-initiated communication requests 101, such as put, get, atomic requests, into coalesced requests to boost performance and improve network efficiency. In at least one embodiment, the coalescing agent 104 can be located in a GPU companion kernel to achieve low-overhead software-based coalescing. In at least one embodiment, the coalescing agent 104 is a software-based coalescing agent that executes on a CPU coupled to the GPU 100. The coalescing agent 104 can use a request queue where the communication requests can be placed and analyzed before being handled by the network 116.

Figure 2:
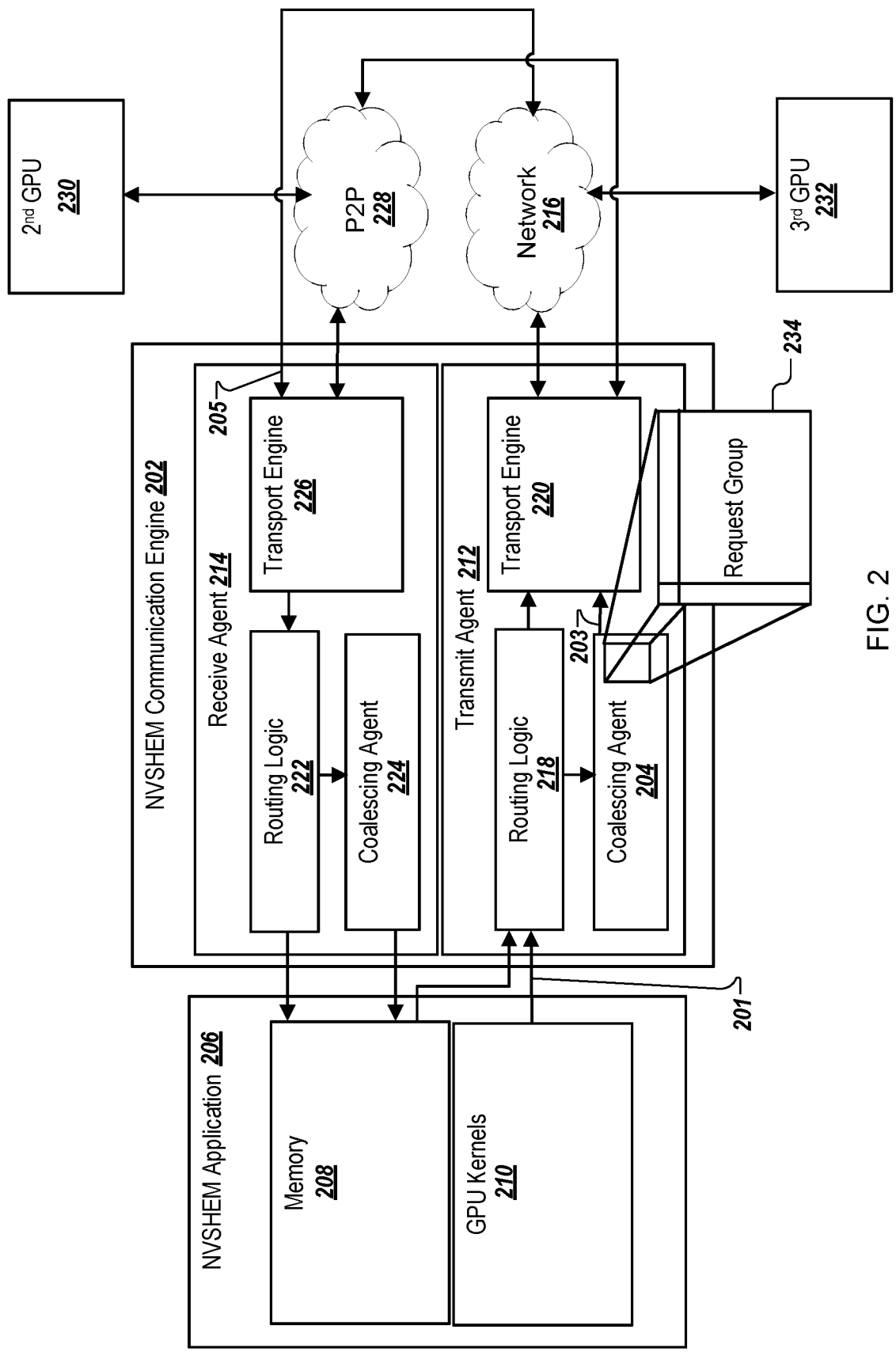
FIG. 2 is a block diagram of a communication engine with a coalescing agent, in accordance with at least some embodiments.

As illustrated in FIG. 2, since the GPU 100 sends the coalesced request 103 over the network 116 to the second GPU 110, the second GPU 110 also includes a communication engine 112 with a coalescing agent 114. The communication engine 112 can determine that an incoming request is the coalesced request 103 (e.g., based on the request header) and pass the coalesced request 103 to the coalescing agent 114 to be processed. The coalescing agent 114 can read a data payload of the coalesced request 103. If the request contains a data payload from a put operation that requires uncoalescing (e.g., unpacking), the coalescing agent 114 reads a data layout description from the data payload and delivers data to a memory (not illustrated in FIG. 1) being associated with the second GPU 110 as indicated in the data layout description.

FIG. 2 is a block diagram of a communication engine 202 with a coalescing agent 204, in accordance with at least some embodiments. Communication engine 202 can provide a shared memory application 206 with seamless P2P transport (e.g., NVLink or PCIe) and network transport (e.g., InfiniBand or remote direct memory access (RDMA) over a converged Ethernet (RoCE)). The shared memory application 206 can utilize memory 208 (e.g., symmetric memory) and one or more GPU kernels 210. In some cases, the shared memory application 206 is executed on an application kernel in a GPU, and the communication engine 202 is executed or otherwise implemented in a companion kernel in the same GPU. In another embodiment, the communication engine 202 is implemented in a different GPU coupled to the GPU with the shared memory application 206. In another embodiment, the communication engine 202 is implemented on a CPU coupled to the GPU with the shared memory application 206. In another embodiment, the communication engine 202 is implemented in a hardware offload circuit coupled to the GPU with the shared memory application 206.

In at least one embodiment, the shared memory application 206 is an NVSHMEM application, and the communication engine 202 is an NVSHMEM communication engine. In at least one embodiment, the communication engine 202 supports a range of asynchronous read (e.g., NVSHMEM get), write (e.g., NVSHMEM put), and atomic update operations from a single GPU thread, multiple GPU threads, warps, CTAs, or other groups of GPU threads. In at least one embodiment, there can be buffer queues (e.g., first-in-first-out (FIFO) queues) between the shared memory application 206 and the communication engine 202 to decouple the components as illustrated in FIG. 2.

In at least one embodiment, the communication engine 202 includes a transmit agent 212, which handles outgoing communication requests 201 by the shared memory application 206. In at least one embodiment, the transmit agent 212 includes routing logic 218, a transport engine 220, and the coalescing agent 204. In at least one embodiment, the communication engine 202 includes a receive agent 214, which handles incoming communication requests. In at least one embodiment, the receive agent 214 includes routing logic 222, a transport engine 226, and a coalescing agent 224.

During the operation of the transmit agent 212, the routing logic 218 determines whether a communication request 201 should be coalesced. In at least one embodiment, the routing logic 218 can determine whether the communication request 201 satisfies a coalescing criterion. The routing logic 218 can perform one or more checks whether the communication request 201 satisfies the coalescing criterion as described below.

In at least one embodiment, the routing logic 218 can determine that the communication request 201 does not satisfy the coalescing criterion responsive to a determination that the communication request 201 is transportable via a P2P connection 228 with a second GPU 230. In at least one embodiment, if the communication request 201 is to the second GPU 230 that is accessible via the P2P connection 228 (e.g., satisfies a P2P connectivity criterion), the communication request 201 can be forwarded directly to the transport engine 220, which may simply pass-through to the direct P2P communication with the second GPU 230 over the P2P connection 228. In at least one embodiment, checks for P2P connectivity can be performed through a combination of static and/or dynamic checking to optimize performance. In at least one embodiment, the routing logic 218 can determine that the communication request 201 does not satisfy the coalescing criterion responsive to a determination that the communication request 201 exceeds a threshold size or otherwise satisfies a size criterion. The routing logic 218, responsive to a determination that the communication request 201 satisfies the size criterion, can forward the communication request 201 directly to the transport engine 220, which may pass the communication request 201 to a third GPU 232 via the network 216. In at least one embodiment, the routing logic 218 can determine that the communication request 201 does not satisfy the coalescing criterion responsive to a determination that the communication request 201 is a latency-sensitive request. In at least one embodiment, the routing logic 218 can determine whether the communication request 201 satisfies a latency criterion. In at least one embodiment, the routing logic 218 can use a heuristic approach to determine whether the communication request 201 satisfies a latency criterion. The routing logic 218, responsive to a determination that the communication request 201 satisfies the latency criterion, can forward the communication request 201 directly to the transport engine 220, which may pass the communication request 201 to the third GPU 232 via the network 216. In at least one embodiment, the routing logic 218 can determine that the communication request 201 originates from a group of threads (e.g., warp or CTA) and the routing logic 218 can perform group-level coalescing before proceeding. Alternatively, the routing logic 218 can determine that the communication request 201 is a coalesced request where group-level coalescing has already been performed on the coalesced request. The routing logic 218 can determine whether the coalesced request satisfies a coalescing criterion similarly as described above with the communication request 201.

In at least one embodiment, responsive to the routing logic 218 determining that the communication request 201 should be coalesced, the coalescing agent 204 stores the communication request 201 in association with a group of requests that have a common property. In at least one embodiment, the coalescing agent 204 inserts a request entry into an associative data structure 234, where it is appended to a request group of similar requests. In at least one embodiment, similar requests can have one or more common properties, such as same operations, same network destination, same GPU destination, adjacent memory locations, or the like. In at least one embodiment, if a new request group is created, the coalescing agent 204 resets a corresponding timer for the new request group. In at least one embodiment, the timer establishes an upper bound on a latency that the request group incurs in the coalescing agent 204. In at least one embodiment, the coalescing agent 204 can specify a group size criterion for the new request group as well. The group size criterion can establish a desired minimum size for network transports over the network 216. In another embodiment, the group size criterion can set a range of sizes and the coalesced request is determined to satisfy the group size criterion if the size of the coalesced request is within the set range of sizes.

In at least one embodiment, the coalescing agent 204 can create and manage one or more associative data structures for one or more groups of requests, respectively. In at least one embodiment, the coalescing agent 204 determines that a timer associated with the group of requests expires or the group's size satisfies a group size criterion. The coalescing agent 204 coalesces the group of requests into a coalesced request 203 and forwards the coalesced request 203 to the transport engine 220. In at least one embodiment, the coalescing agent periodically scans the list of request groups. Any groups whose timer has expired are coalesced and forwarded to the transport engine 220. In at least one embodiment, the transport engine 220 sends the coalesced request 203 to the destination (e.g., third GPU 232). In at least one embodiment, the transport engine 220 can pass P2P communication requests (e.g., P2P transfers) as direct P2P transfers via the P2P connection(s) 228. The P2P transfers can be contiguous or noncontiguous transfers. In at least one embodiment, for contiguous network transfers, the transport agent 220 can transport the communication requests via RDMA operations. In at least one embodiment, for noncontiguous network transfers, the transport agent 220 can write or read a packed data payload to or from the destination. In at least one embodiment, the transport engine 220 can coordinate with the destination to establish a noncontiguous data transfer (e.g., using I/O vector transmission or the User-Mode Memory Registration (UMR) feature of an InfiniBand NIC).

During the operation of the receive agent 214, the transport engine 226 notifies the routing logic 222 that a communication request 205 was received. The routing logic 222 determines whether the communication request 205 should be uncoalesced. In at least one embodiment, the routing logic 222 can determine whether the communication request 205 has a payload directed to contiguous memory or an RDMA noncontiguous transfer was performed (e.g., using IOV or UMR capability). For RDMA and P2P transfers, it should be appreciated that functions of the transport engine 226 and routing logic 222 may be considered to be implemented entirely by the underlying hardware, and the software processing can be bypassed. In another embodiment, the routing logic 222 can determine that the communication request 205 includes a data payload for a write operation (e.g., put) that requires uncoalescing (e.g., unpacking). In this scenario, the coalescing agent 224 reads a data layout description from the data payload and delivers data words to the memory 208 as indicated. In at least one embodiment, if the communication request 205 includes a data payload from an atomic operation that requires uncoalescing (e.g., unpacking), the coalescing agent 224 reads a data layout description from the data payload and performs atomic updates to the memory 208 as indicated. If the atomic operations request return data, the coalescing agent 224 generates a packed data response and returns to the initiator through the transmit agent 212. In at least one embodiment, if the communication request 205 is for a read that requires uncoalescing, the coalescing agent 224 reads a data layout description from the data payload, generates the packed data response, and returns the data through the transmit agent 212. In at least one embodiment, if the communication request 205 is associated with a small data payload, the coalescing agent 224 can send the responses to the transmit agent 212 for coalescing by forming request groups to aggregate responses to the initiators.

Figure 3:
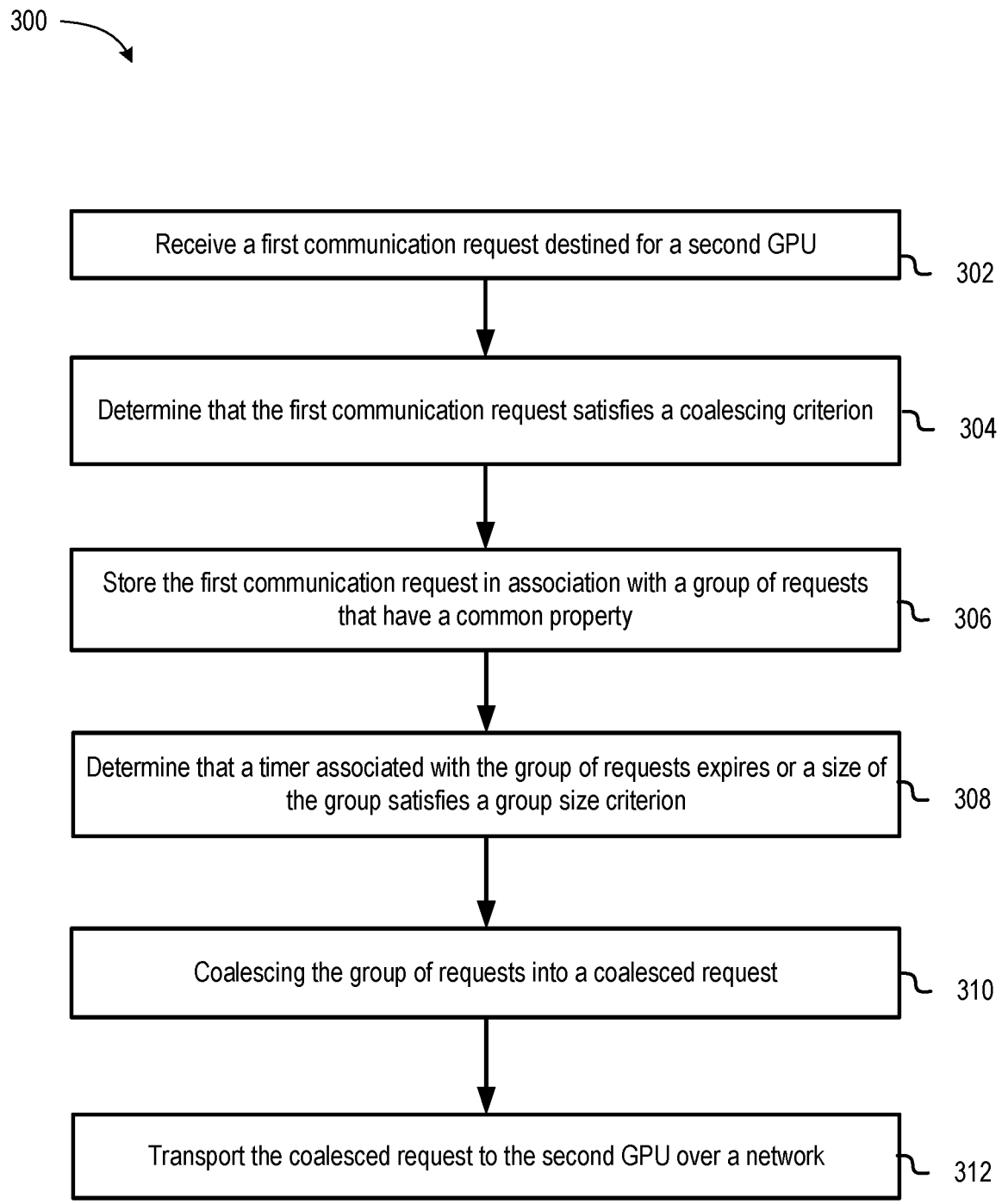
FIG. 3 is a flow diagram of a method for coalescing a group of communication requests into a coalesced request, in accordance with at least some embodiments.

FIG. 3 is a flow diagram of a method 300 for coalescing a group of communication requests into a coalesced request, in accordance with at least some embodiments. Method 300 can be performed by processing logic comprising hardware, software, firmware, or any combination thereof. In at least one embodiment, the method 300 is performed by the communication engine 102 or the coalescing agent 104 of FIG. 1. In at least one embodiment, the method 300 is performed by the communication engine 202 of FIG. 2. In at least one embodiment, the method 300 is performed by the transmit agent 212 of FIG. 2. In at least one embodiment, the method 300 is performed by the routing logic 218 and coalescing agent 204 of FIG. 2.

Referring back to FIG. 3, the method 300 begins by processing logic receiving, from a shared memory application executing on a first GPU, a first communication request initially assigned to and/or having a second GPU (block 302) as a destination for processing. The processing logic determines that the first communication request satisfies a coalescing criterion (block 304). The processing logic stores the first communication request in association with a group of requests with a common property (block 306). In at least one embodiment, the common property is at least one of the same operation type, the same network destination, the same GPU destination, or adjacent memory locations. The processing logic determines that a timer associated with the group of requests expires or the group's size satisfies a group size criterion (block 308). The processing logic coalesces the group of requests into a coalesced request (block 310). The processing logic transports the coalesced request to the second GPU over a network (block 312).

In a further embodiment, the processing logic receives a second communication request. In at least one embodiment, the first communication request originates from a first group of threads of the first GPU, and the second communication request originates from a second group of threads of the first GPU. The processing logic determines that the second communication request satisfies the coalescing criterion and that it has a common property with the first communication request. The processing logic stores the second communication request in association with the group of requests with the common property.

In at least one embodiment, the processing logic receives a second communication request initially assigned to and/or having a third GPU as a destination for processing. The processing logic determines that the second communication request does not satisfy the coalescing criterion. For example, the second communication is transportable via a P2P connection with the third GPU. In at least one embodiment, the second communication request does not satisfy the coalescing criterion for other reasons. The processing logic transports the second communication request to the third GPU over the P2P connection.

In at least one embodiment, the processing logic determines that the first communication request satisfies the coalescing criterion by determining that the first communication request satisfies at least one of a request size criterion, a latency criterion, or a P2P connectivity criterion.

In at least one embodiment, the processing logic receives a second communication request that originates from a group of threads of the first GPU and is initially assigned to and/or has a third GPU as a destination. The processing logic performs group-level coalescing of the second communication request with other communication requests from the group of threads to obtain a group-level request. The processing logic determines that the group-level request satisfies the coalescing criterion and stores the group-level request in association with a second group of requests with a common property. The processing logic determines that a second timer associated with the second group of requests expires or the second group's size satisfies the group size criterion. The processing logic coalesces the second group of requests into a second coalesced request and transports the second coalesced request to the third GPU. In another embodiment, the processing logic receives a communication request that is already a group-level coalesced request where another entity has already performed group-level coalescing.

As described herein, in at least one embodiment, the processing logic is implemented as software in the first GPU that executes the shared memory application, as software in a second GPU that is coupled to the first GPU, as software in a CPU coupled to the first GPU, or as hardware such as in a hardware offload circuit. In at least one embodiment, the processing logic is implemented in a first kernel, a companion kernel, in the first GPU, and the shared memory application is executed in a second kernel in the first GPU. Additional details of different configurations are described below with respect to FIGS. 4-7.

Figure 4:
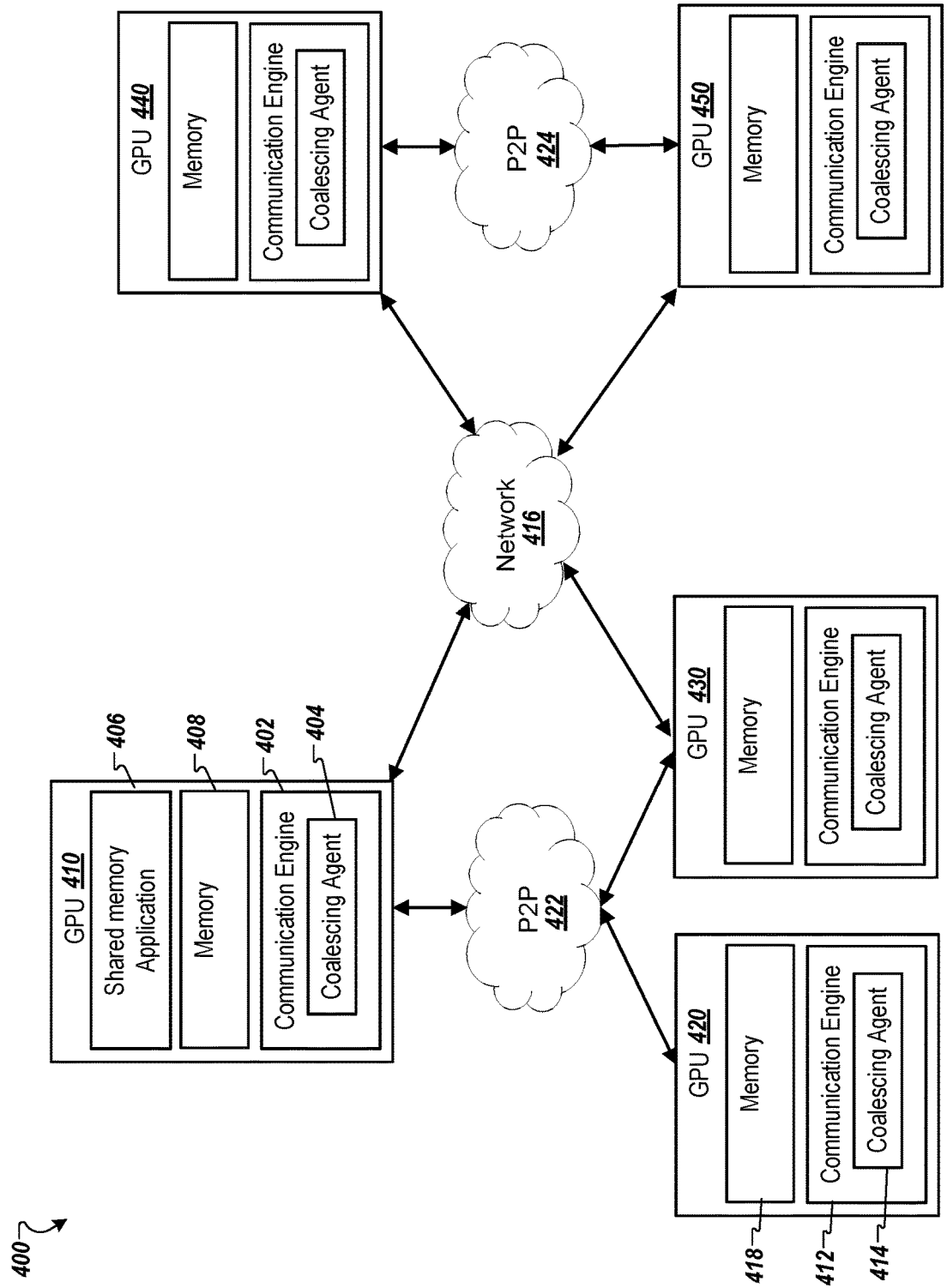
FIG. 4 is a network diagram of a computer system having multiple GPUs coupled via a network and peer-to-peer (P2P) connections, the GPUs each including a communication engine with a coalescing agent, in accordance with at least some embodiments.

FIG. 4 is a network diagram of a computer system 400 having multiple GPUs coupled via a network 416 and peer-to-peer (P2P) connections 428, the GPUs each including a communication engine with a coalescing agent, in accordance with at least some embodiments. Computer system 400 includes a first GPU 410, a second GPU 420, a third GPU 430, a fourth GPU 440, and a fifth GPU 450. The first GPU 410 includes memory 408 and a communication engine 420, which includes a coalescing agent 404. The communication engine 420 and coalescing agent 404 are similar to the communication engines and coalescing agents described above with respect to FIGS. 1-3. The first GPU 410 executes a shared memory application 406 that can communicate with other GPUs for data transfers to other memory distributed at other GPUs.

It should be noted that although illustrated as part of the GPUs, the memory can be external to the GPU but otherwise associated with the respective GPU. For example, the memory 408 is local to the first GPU 410, whereas memory 418 is local to the second GPU 420. The first GPU 410 can send or receive communication requests to and from the second GPU 420 via a first P2P connection in a P2P fabric or P2P network 422. The first GPU 410 can send or receive communication requests to and from the third GPU 430 via a second P2P connection in the P2P fabric or P2P network 422. The first GPU 410 can send or receive communication requests to and from the fourth GPU 440 via a network 416. The first GPU 410 can send or receive communication requests to and from the fifth GPU 450 via the network 416. As illustrated, the fourth GPU 440 can send or receive communication requests to and from the fifth GPU 450 via a P2P connection in a P2P fabric or P2P network 424. During operation, the communication engine 402 can receive a communication request from the shared memory application 406 and determine whether the communication request should be coalesced. If the communication request should be coalesced, the coalescing agent 404 coalesces the communication request with a group of requests into a coalesced request and sends the coalesced request over the network 416. If the communication request does not need to be coalesced, the communication engine 402 can send the destination GPU's communication request via the appropriate connection (e.g., P2P 422, network 416). Each of the GPUs can include a corresponding memory and communication engine with a coalescing agent. In other embodiments, multiple GPUs can be connected via P2P and network connections in other configurations.

Figure 5:
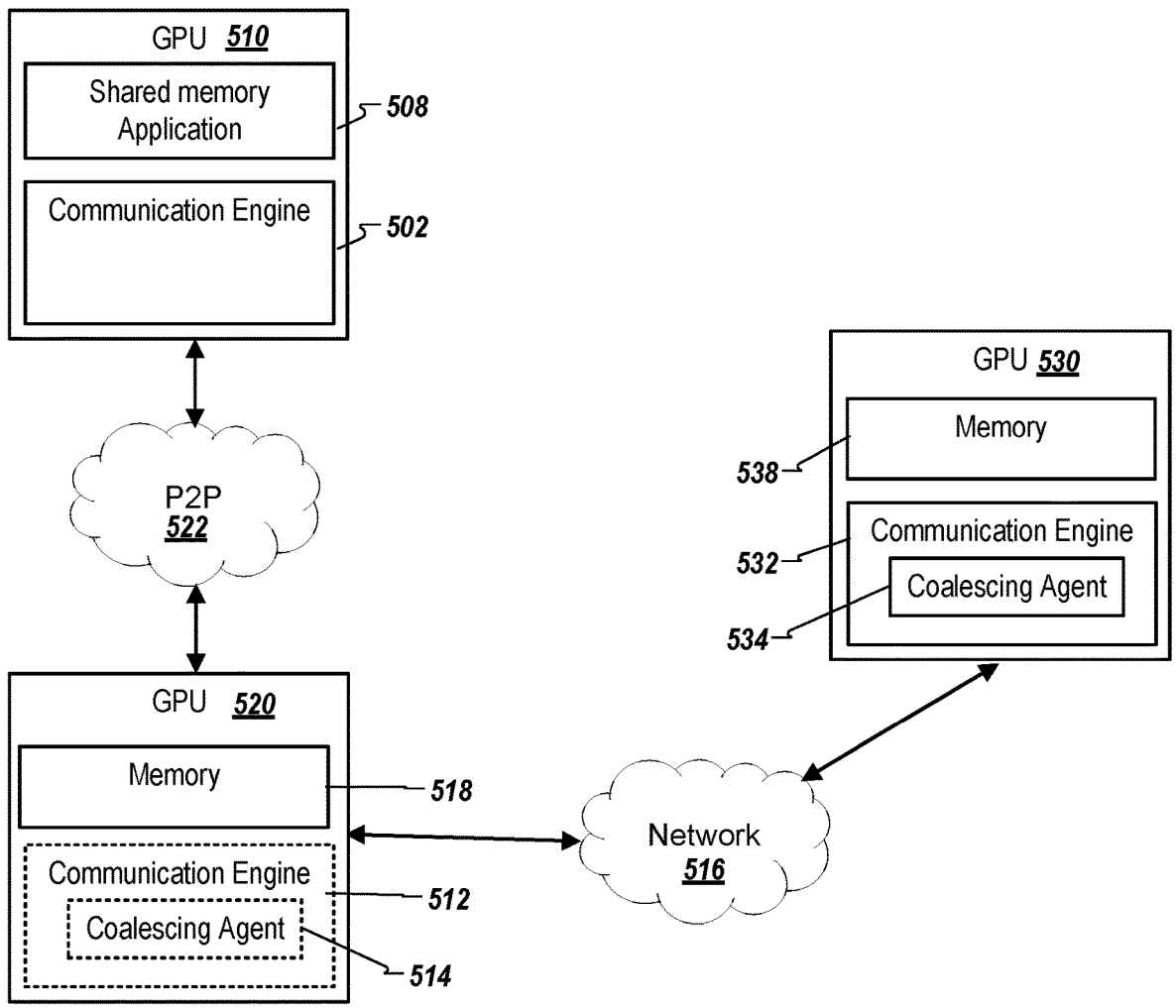
FIG. 5 is a network diagram of a first GPU coupled to a second GPU having a coalescing agent, in accordance with at least some embodiments.

FIG. 5 is a network diagram of a first GPU 510 coupled to a second GPU 520 having a coalescing agent 514, in accordance with at least some embodiments. The first GPU 510 executes a shared memory application 508 that sends or receives communication requests to and from other GPUs. The communication engine 502 may not include a coalescing agent as it is not connected to a network 516. In at least one embodiment, the communication engine 502 sends communication requests to the communication engine 512 of the second GPU 520 via P2P connection 522, and the communication engine 512 can determine if the communication requests should be coalesced by the coalescing agent 514. The coalescing agent 514 can coalesce the communication requests into a coalesced request and send the coalesced request to a third GPU 530 via the network 516. The third GPU 530 includes memory 538 and communication engine 532, which includes a coalescing agent 534. The communication engine 532 can determine if a received request needs to be uncoalesced and use the coalescing agent 534 to uncoalesce those requests.

Figure 6:
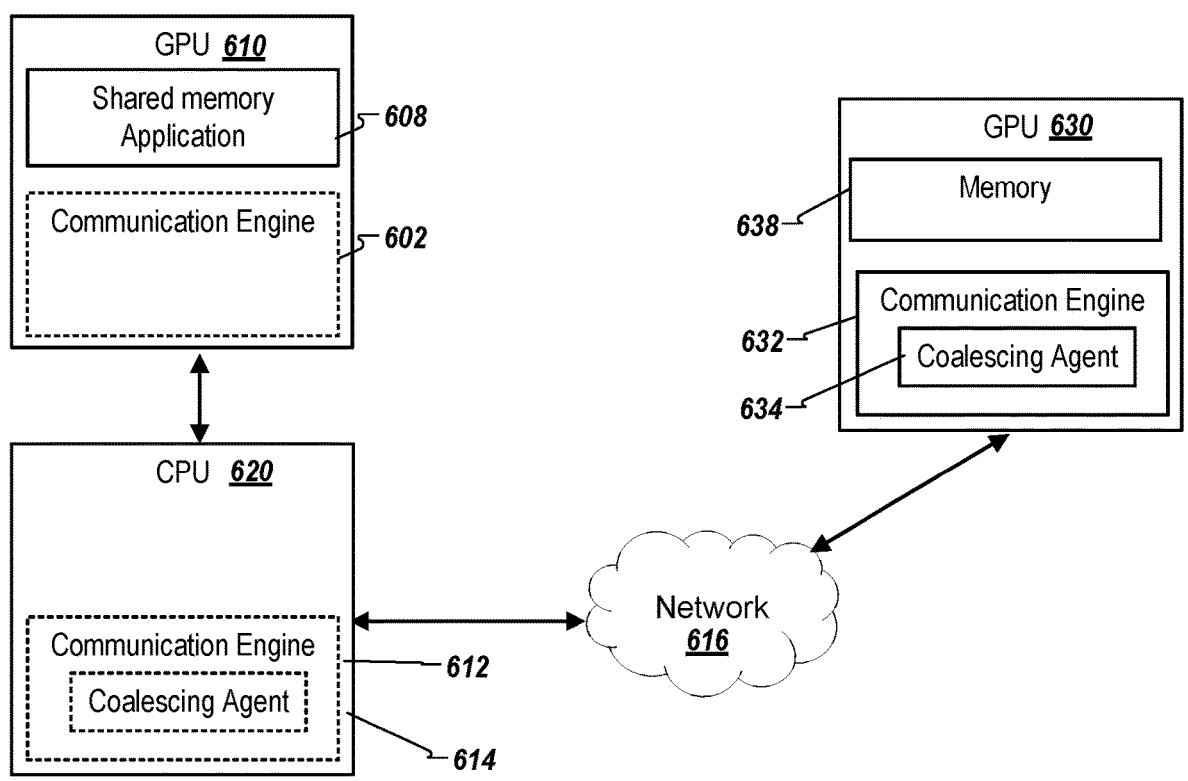
FIG. 6 is a network diagram of a first GPU coupled to a CPU having a coalescing agent, in accordance with at least some embodiments.

FIG. 6 is a network diagram of a first GPU 610 coupled to a CPU 620 having a coalescing agent 614, in accordance with at least some embodiments. The first GPU 610 executes a shared memory application 608 that sends or receives communication requests to and from other GPUs. The communication engine 602 may not include a coalescing agent as it is not connected to a network 616. In at least one embodiment, the communication engine 602 sends communication requests to the communication engine 612 of the second GPU 620 via P2P connection 622, and the communication engine 612 can determine if the communication requests should be coalesced by the coalescing agent 614. The coalescing agent 614 can coalesce the communication requests into a coalesced request and send the coalesced request to a third GPU 630 via the network 616. The third GPU 630 includes memory 638 and communication engine 632, which includes a coalescing agent 634. The communication engine 632 can determine if a received request needs to be uncoalesced and use the coalescing agent 634 to uncoalesce those requests.

Figure 7:
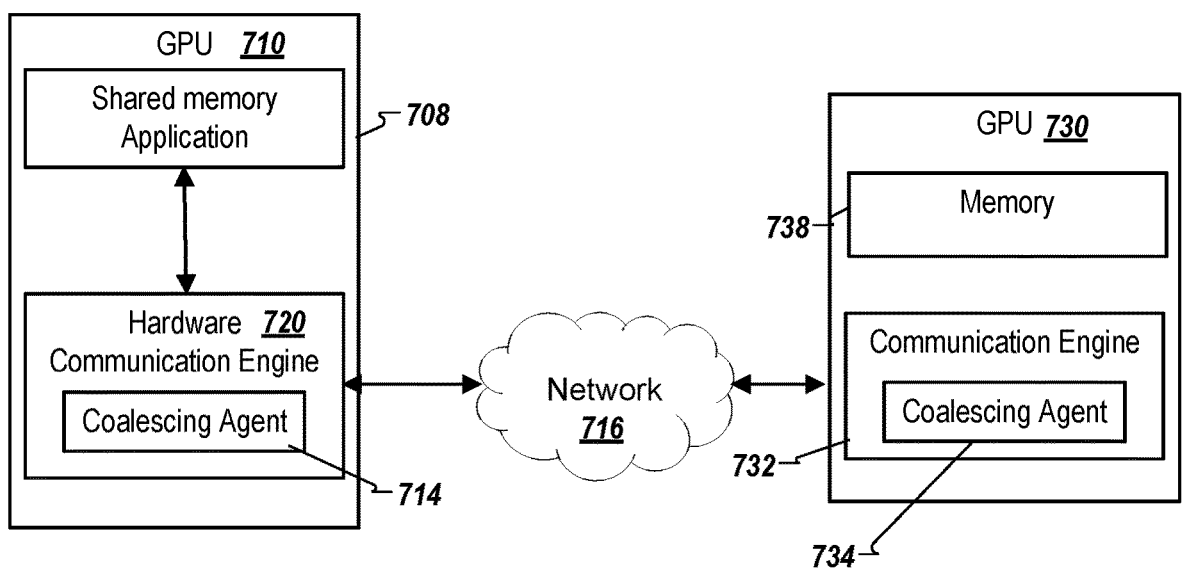
FIG. 7 is a network diagram of a first GPU coupled to a hardware offload circuit having a coalescing agent, in accordance with at least some embodiments.

FIG. 7 is a network diagram of a first GPU 710 coupled to a hardware offload circuit 720 having a coalescing agent 714, in accordance with at least some embodiments. The first GPU 710 executes a shared memory application 708 that sends or receives communication requests to and from other GPUs. The communication engine 702 includes a hardware communication engine 720 connected to a network 716. In at least one embodiment, the shared memory application 708 sends communication requests to the hardware communication engine 720, and the hardware communication engine 720 can determine if the communication requests should be coalesced by the coalescing agent 714. The coalescing agent 714 can coalesce the communication requests into a coalesced request and send the coalesced request to a third GPU 730 via the network 716. The third GPU 730 includes memory 738 and communication engine 732, which includes a coalescing agent 734. The communication engine 732 can also be a hardware communication engine. The communication engine 732 can determine if a received request needs to be uncoalesced and use the coalescing agent 734 to uncoalesce those requests.

Figure 8:
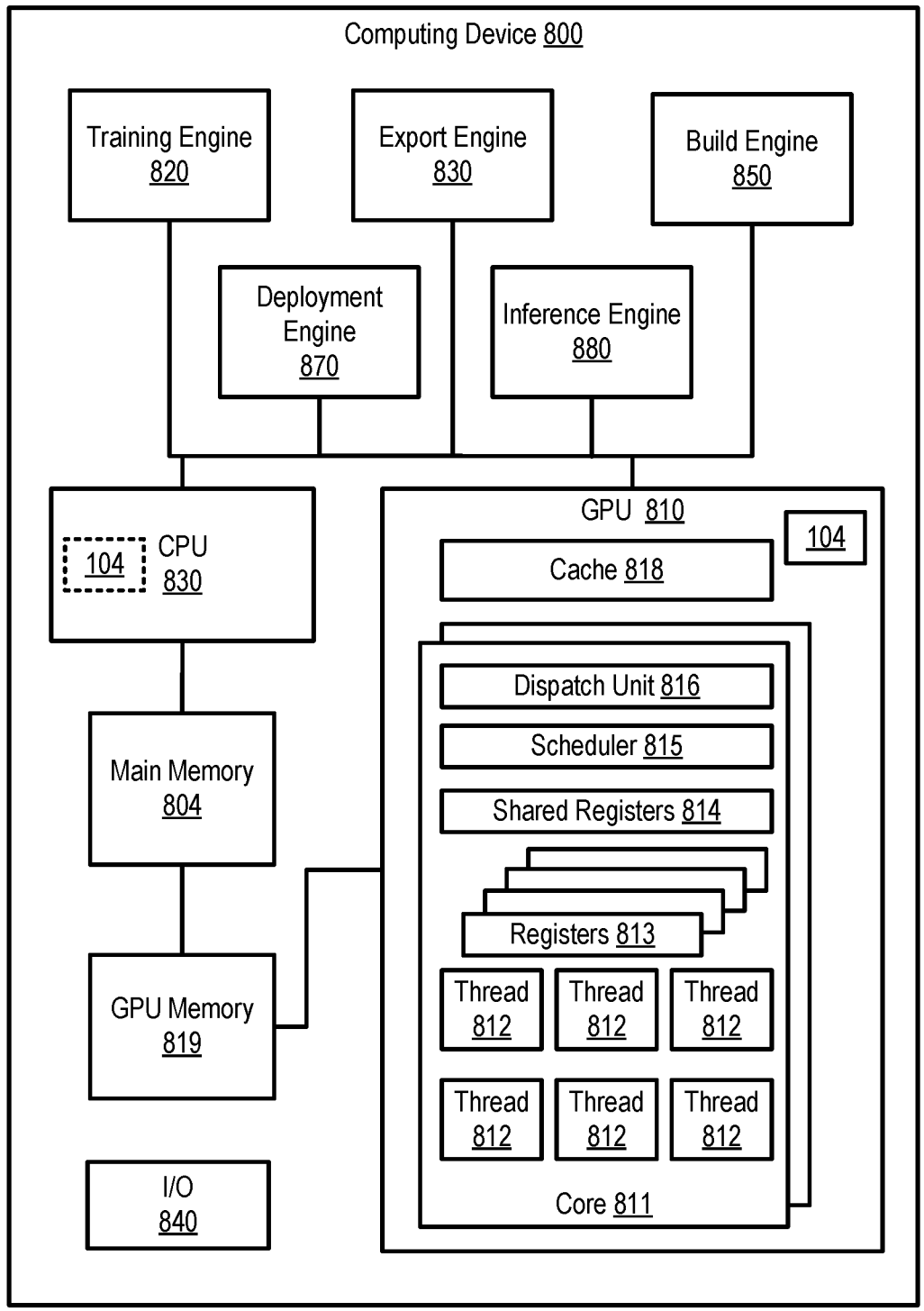
FIG. 8 is a block diagram of a computing device having a GPU with a coalescing agent, in accordance with at least some embodiments.

FIG. 8 is a block diagram of a computing device 800 having a GPU with a coalescing agent 104, in accordance with at least some embodiments. In some embodiments, computing device 800 may include engines of a customizable pipeline, including training engine 820, export engine 830, build engine 850, deployment engine 870, and inference engine 880. Although FIG. 8 depicts all engines as part of the same computing device, in some implementations, any of the engines shown may in fact be implemented on different computing devices, including virtual computing devices, cloud-based processing devices, and the like. For example, computing device 800 may include inference engine 880 but not other engines of the customizable pipeline. Inference engine 880 (and/or any other engines of the pipeline) may be executed by one or more GPUs 810 to perform speech recognition, object recognition, or any other inferencing involving machine learning. In some embodiments, a GPU 810 includes multiple cores 811, each core being capable of executing multiple threads 812. Each core may run multiple threads 812 concurrently (e.g., in parallel). In some embodiments, threads 812 may have access to registers 813. Registers 813 may be thread-specific registers with access to a register restricted to a respective thread. Additionally, shared registers 814 may be accessed by all threads of the core. In some embodiments, each core 811 may include a scheduler 815 to distribute computational tasks and processes among different threads 812 of core 811. A dispatch unit 816 may implement scheduled tasks on appropriate threads using correct private registers 813 and shared registers 814. Computing device 800 may include input/output component(s) 834 to facilitate exchange of information with one or more users or developers.

In some embodiments, GPU 810 may have a (high-speed) cache 818, access to which may be shared by multiple cores 811. Furthermore, computing device 800 may include a GPU memory 819 where GPU 810 may store intermediate and/or final results (outputs) of various computations performed by GPU 810. After completion of a particular task, GPU 810 (or CPU 830) may move the output to (main) memory 804. In some embodiments, CPU 830 may execute processes that involve serial computational tasks (assigned by one of the engines of the pipeline) whereas GPU 810 may execute tasks (such as multiplication of inputs of a neural node by weights and adding biases) that are amenable to parallel processing. In some embodiments, a respective engine of the pipeline (e.g., build engine 850, inference engine 880, etc.) may determine which processes managed by the respective engine are to be executed on GPU 810 and which processes are to be executed on CPU 830. In some embodiments, CPU 830 may determine which processes are to be executed on GPU 810 and which processes are to be executed on CPU 830.

As illustrated in FIG. 8, the GPU 810 includes a coalescing agent 104. The coalescing agent 104 can be part of a communication engine of the GPU 810. The coalescing agent 104 operates in a similar manner as the communication engines and coalescing agents described above with respect to FIGS. 1-7. In at least one embodiment, the GPU 810 sends and receives communication requests with other GPUs via P2P connections and network connections. For communication request over the network, the coalescing agent 104 determines whether the communication request satisfies a coalescing criterion. When the communication request satisfies the coalescing criterion, the coalescing agent stores the communication request in associated with a group of requests that have a common property. The coalescing agent 104 whether a timer associated with the group of requests expires or a size of the group satisfies a group size criterion. The coalescing agent 104 coalesces the group of request into a coalesced request in response to the timer expiring or the size of the group satisfies the group size criterion. The coalescing agent 104 sends the coalesced request to a second GPU over a network.

Data Center

Figure 9:
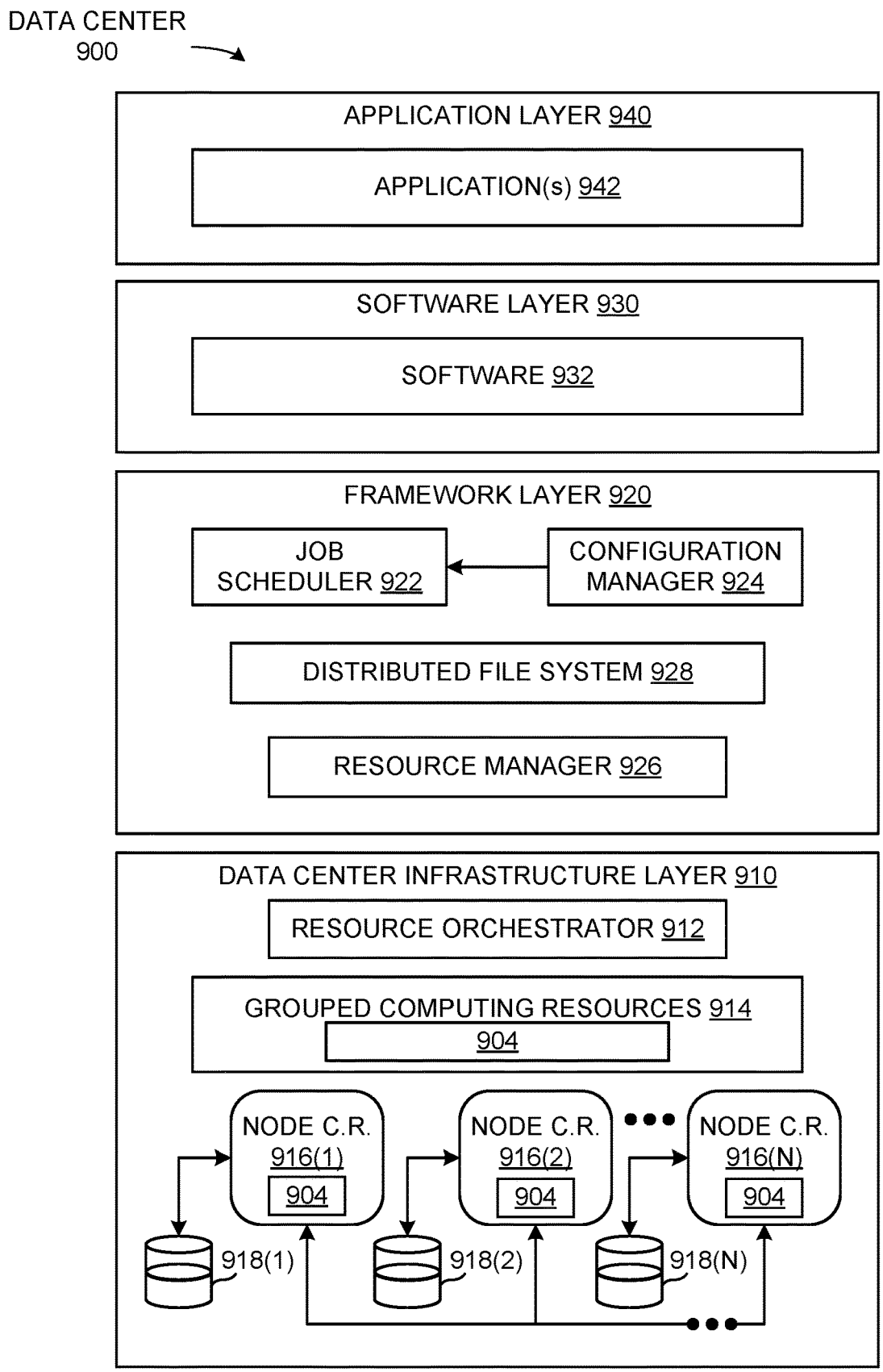
FIG. 9 illustrates an example data center system, according to at least one embodiment.

FIG. 9 illustrates an example data center 900, in which at least one embodiment may be used. In at least one embodiment, data center 900 includes a data center infrastructure layer 910, a framework layer 920, a software layer 930, and an application layer 940.

In at least one embodiment, as shown in FIG. 9, data center infrastructure layer 910 may include a resource orchestrator 912, grouped computing resources 914, and node computing resources ("node C.R.s") 916(1)-916(N), where "N" represents any whole, positive integer. In at least one embodiment, node C.R.s 916(1)-916(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 916(1)-916(N) may be a server having one or more of above-mentioned computing resources.

In at least one embodiment, grouped computing resources 914 may include separate groupings of node C.R.s housed within one or more racks (not shown), or many racks housed in data centers at various geographical locations (also not shown). Separate groupings of node C.R.s within grouped computing resources 914 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 912 may configure or otherwise control one or more node C.R.s 916(1)-916(N) and/or grouped computing resources 914. In at least one embodiment, resource orchestrator 912 may include a software design infrastructure ("SDI") management entity for data center 900. In at least one embodiment, resource orchestrator may include hardware, software or some combination thereof.

In at least one embodiment, as shown in FIG. 9, framework layer 920 includes a job scheduler 922, a configuration manager 924, a resource manager 926 and a distributed file system 928. In at least one embodiment, framework layer 920 may include a framework to support software 932 of software layer 930 and/or one or more application(s) 942 of application layer 940. In at least one embodiment, software 932 or application(s) 942 may respectively include web-based service software or applications, such as those provided by Amazon Web Services, Google Cloud and Microsoft Azure. In at least one embodiment, framework layer 920 may be, but is not limited to, a type of free and open-source software web application framework such as Apache Spark™ (hereinafter "Spark") that may utilize distributed file system 928 for large-scale data processing (e.g., "big data"). In at least one embodiment, job scheduler 922 may include a Spark driver to facilitate scheduling of workloads supported by various layers of data center 900. In at least one embodiment, configuration manager 924 may be capable of configuring different layers such as software layer 930 and framework layer 920 including Spark and distributed file system 928 for supporting large-scale data processing. In at least one embodiment, resource manager 926 may be capable of managing clustered or grouped computing resources mapped to or allocated for support of distributed file system 928 and job scheduler 922. In at least one embodiment, clustered or grouped computing resources may include grouped computing resource 914 at data center infrastructure layer 910. In at least one embodiment, resource manager 926 may coordinate with resource orchestrator 912 to manage these mapped or allocated computing resources.

In at least one embodiment, software 932 included in software layer 930 may include software used by at least portions of node C.R.s 916(1)-916(N), grouped computing resources 914, and/or distributed file system 928 of framework layer 920. The one or more types of software may include, but are not limited to, Internet web page search software, e-mail virus scan software, database software, and streaming video content software.

In at least one embodiment, application(s) 942 included in application layer 940 may include one or more types of applications used by at least portions of node C.R.s 916(1)-916(N), grouped computing resources 914, and/or distributed file system 928 of framework layer 920. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 924, resource manager 926, and resource orchestrator 912 may implement any number and type of self-modifying actions based on any amount and type of data acquired in any technically feasible fashion. In at least one embodiment, self-modifying actions may relieve a data center operator of data center 900 from making possibly bad configuration decisions and possibly avoiding underutilized and/or poor performing portions of a data center.

In at least one embodiment, data center 900 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 900. In at least one embodiment, trained machine learning models corresponding to one or more neural networks may be used to infer or predict information using resources described above with respect to data center 900 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Communication engine and coalescing agent logic 904 are used to perform automatic coalescing of communication requests over a network. Details regarding communication engine and coalescing agent logic 904 are provided above with respect to FIGS. 1-8. In at least one embodiment, communication engine and coalescing agent logic 904 may be used in system FIG. 9 for automatic coalescing operations for computing systems using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Autonomous Vehicle

Figure 10A:
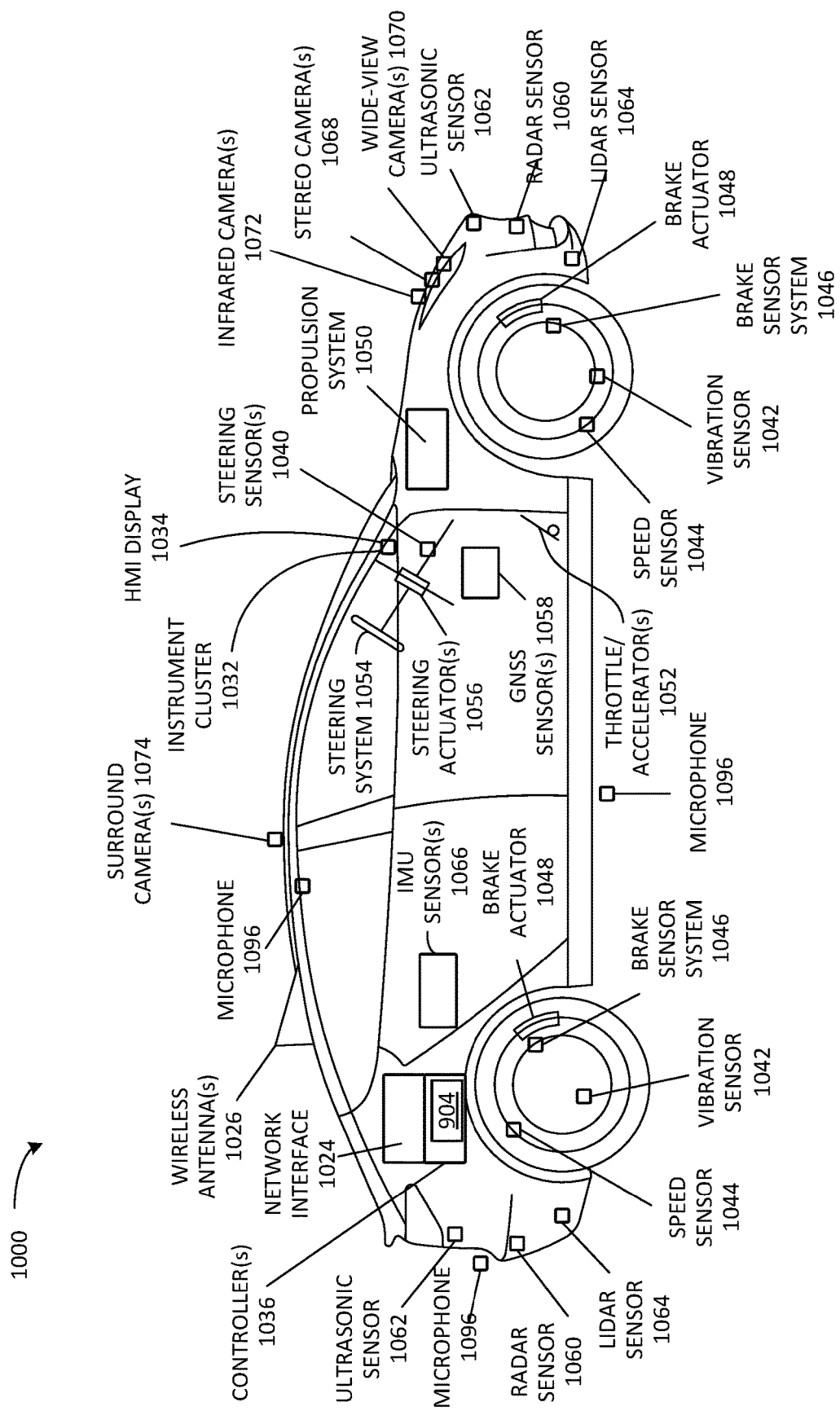
FIG. 10A illustrates an example of an autonomous vehicle, according to at least one embodiment.

FIG. 10A illustrates an example of an autonomous vehicle 1000, according to at least one embodiment. In at least one embodiment, autonomous vehicle 1000 (alternatively referred to herein as "vehicle 1000") may be, without limitation, a passenger vehicle, such as a car, a truck, a bus, and/or another type of vehicle that accommodates one or more passengers. In at least one embodiment, vehicle 1000 may be a semi-tractor-trailer truck used for hauling cargo. In at least one embodiment, vehicle 1000 may be an airplane, robotic vehicle, or other kind of vehicle.

Autonomous vehicles may be described in terms of automation levels, defined by National Highway Traffic Safety Administration ("NHTSA"), a division of US Department of Transportation, and Society of Automotive Engineers ("SAE") "Taxonomy and Definitions for Terms Related to Driving Automation Systems for On-Road Motor Vehicles" (e.g., Standard No. J3016-201806, published on Jun. 15, 2018, Standard No. J3016-201609, published on Sep. 30, 2016, and previous and future versions of this standard). In one or more embodiments, vehicle 1000 may be capable of functionality in accordance with one or more of level 1-level 5 of autonomous driving levels. For example, in at least one embodiment, vehicle 1000 may be capable of conditional automation (Level 3), high automation (Level 4), and/or full automation (Level 5), depending on embodiment.

In at least one embodiment, vehicle 1000 may include, without limitation, components such as a chassis, a vehicle body, wheels (e.g., 2, 4, 6, 8, 18, etc.), tires, axles, and other components of a vehicle. In at least one embodiment, vehicle 1000 may include, without limitation, a propulsion system 1050, such as an internal combustion engine, hybrid electric power plant, an all-electric engine, and/or another propulsion system type. In at least one embodiment, propulsion system 1050 may be connected to a drive train of vehicle 1000, which may include, without limitation, a transmission, to enable propulsion of vehicle 1000. In at least one embodiment, propulsion system 1050 may be controlled in response to receiving signals from a throttle/accelerator(s) 1052.

In at least one embodiment, a steering system 1054, which may include, without limitation, a steering wheel, is used to steer a vehicle 1000 (e.g., along a desired path or route) when a propulsion system 1050 is operating (e.g., when vehicle is in motion). In at least one embodiment, a steering system 1054 may receive signals from steering actuator(s) 1056. A steering wheel may be optional for full automation (Level 5) functionality. In at least one embodiment, a brake sensor system 1046 may be used to operate vehicle brakes in response to receiving signals from brake actuator(s) 1048 and/or brake sensors.

In at least one embodiment, controller(s) 1036, which may include, without limitation, one or more system on chips ("SoCs") (not shown in FIG. 10A) and/or graphics processing unit(s) ("GPU(s)"), provide signals (e.g., representative of commands) to one or more components and/or systems of vehicle 1000. For instance, in at least one embodiment, controller(s) 1036 may send signals to operate vehicle brakes via brake actuator(s) 1048, to operate steering system 1054 via steering actuator(s) 1056, and/or to operate propulsion system 1050 via throttle/accelerator(s) 1052. Controller(s) 1036 may include one or more onboard (e.g., integrated) computing devices (e.g., supercomputers) that process sensor signals, and output operation commands (e.g., signals representing commands) to enable autonomous driving and/or to assist a human driver in driving vehicle 1000. In at least one embodiment, controller(s) 1036 may include a first controller 1036 for autonomous driving functions, a second controller 1036 for functional safety functions, a third controller 1036 for artificial intelligence functionality (e.g., computer vision), a fourth controller 1036 for infotainment functionality, a fifth controller 1036 for redundancy in emergency conditions, and/or other controllers. In at least one embodiment, a single controller 1036 may handle two or more of above functionalities, two or more controllers 1036 may handle a single functionality, and/or any combination thereof.

In at least one embodiment, controller(s) 1036 provide signals for controlling one or more components and/or systems of vehicle 1000 in response to sensor data received from one or more sensors (e.g., sensor inputs). In at least one embodiment, sensor data may be received from, for example and without limitation, global navigation satellite systems ("GNSS") sensor(s) 1058 (e.g., Global Positioning System sensor(s)), RADAR sensor(s) 1060, ultrasonic sensor(s) 1062, LIDAR sensor(s) 1064, inertial measurement unit ("IMU") sensor(s) 1066 (e.g., accelerometer(s), gyroscope (s), magnetic compass(es), magnetometer(s), etc.), microphone(s) 1096, stereo camera(s) 1068, wide-view camera(s) 1070 (e.g., fisheye cameras), infrared camera(s) 1072, surround camera(s) 1074 (e.g., 360 degree cameras), long-range cameras (not shown in FIG. 10A), mid-range camera (s) (not shown in FIG. 10A), speed sensor(s) 1044 (e.g., for measuring speed of vehicle 1000), vibration sensor(s) 1042, steering sensor(s) 1040, brake sensor(s) (e.g., as part of brake sensor system 1046), and/or other sensor types.

In at least one embodiment, one or more of controller(s) 1036 may receive inputs (e.g., represented by input data) from an instrument cluster 1032 of vehicle 1000 and provide outputs (e.g., represented by output data, display data, etc.) via a human-machine interface ("HMI") display 1034, an audible annunciator, a loudspeaker, and/or via other components of vehicle 1000. In at least one embodiment, outputs may include information such as vehicle velocity, speed, time, map data (e.g., a High Definition map (not shown in FIG. 10A), location data (e.g., vehicle 1000's location, such as on a map), direction, location of other vehicles (e.g., an occupancy grid), information about objects and status of objects as perceived by controller(s) 1036, etc. For example, in at least one embodiment, HMI display 1034 may display information about presence of one or more objects (e.g., a street sign, caution sign, traffic light changing, etc.), and/or information about driving maneuvers vehicle has made, is making, or will make (e.g., changing lanes now, taking exit 34B in two miles, etc.).

In at least one embodiment, vehicle 1000 further includes a network interface 1024 which may use wireless antenna(s) 1026 and/or modem(s) to communicate over one or more networks. For example, in at least one embodiment, network interface 1024 may be capable of communication over Long-Term Evolution ("LTE"), Wideband Code Division Multiple Access ("WCDMA"), Universal Mobile Telecommunications System ("UMTS"), Global System for Mobile communication ("GSM"), IMT-CDMA Multi-Carrier ("CDMA2000"), etc. In at least one embodiment, wireless antenna(s) 1026 may also enable communication between objects in environment (e.g., vehicles, mobile devices, etc.), using local area network(s), such as Bluetooth, Bluetooth Low Energy ("LE"), Z-Wave, ZigBee, etc., and/or low power wide-area network(s) ("LPWANs"), such as LoRaWAN, SigFox, etc.

Communication engine and coalescing agent logic 904 are used to perform automatic coalescing of communication requests over a network. Details regarding communication engine and coalescing agent logic 904 are provided above with respect to FIGS. 1-8. In at least one embodiment, communication engine and coalescing agent logic 904 may be used in system FIG. 10A for automatic coalescing operations for computing systems using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Figure 10B:
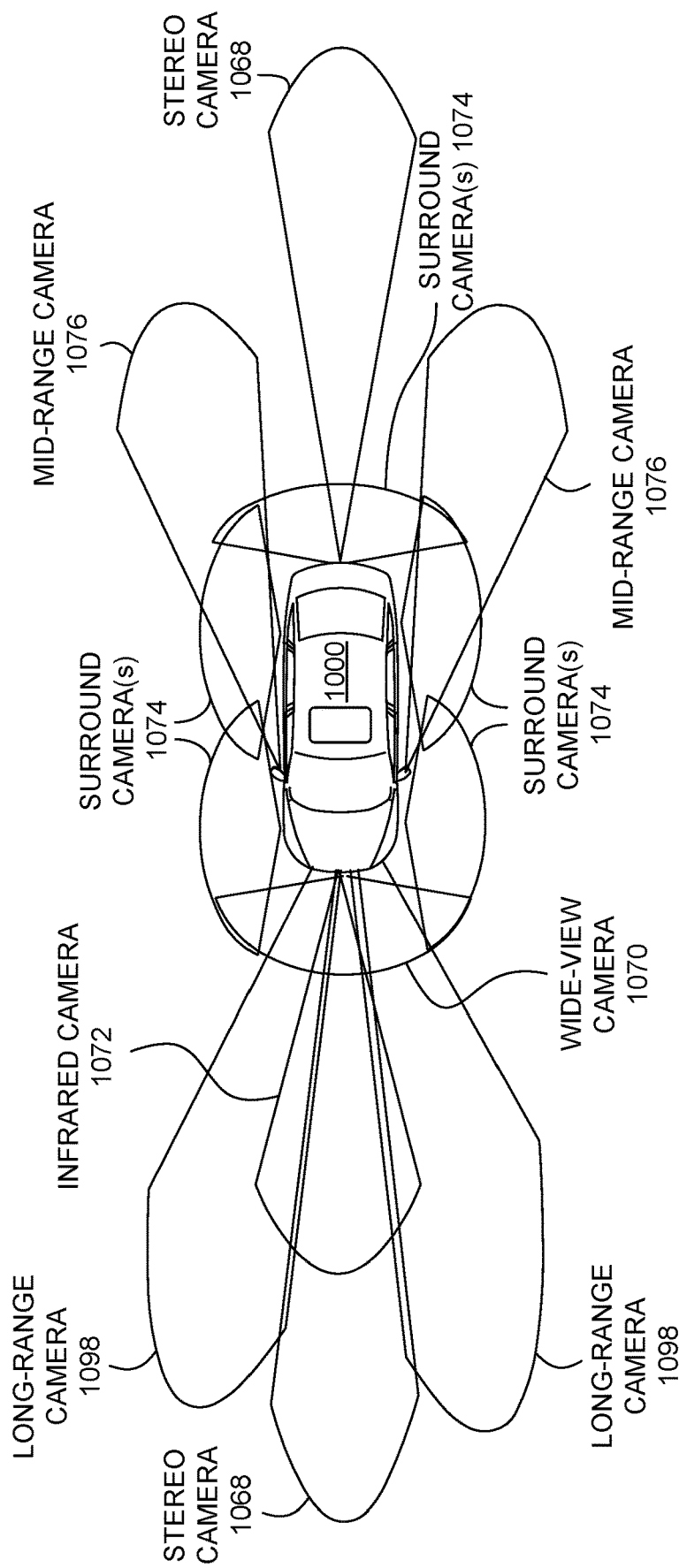
FIG. 10B illustrates an example of camera locations and fields of view for the autonomous vehicle of FIG. 10A, according to at least one embodiment.

FIG. 10B illustrates an example of camera locations and fields of view for autonomous vehicle 1000 of FIG. 10A, according to at least one embodiment. In at least one embodiment, cameras and respective fields of view are one example embodiment and are not intended to be limiting. For instance, in at least one embodiment, additional and/or alternative cameras may be included and/or cameras may be located at different locations on vehicle 1000.

In at least one embodiment, camera types for cameras may include, but are not limited to, digital cameras that may be adapted for use with components and/or systems of vehicle 1000. In at least one embodiment, one or more of camera(s) may operate at automotive safety integrity level ("ASIL") B and/or at another ASIL. In at least one embodiment, camera types may be capable of any image capture rate, such as 60 frames per second (fps), 120 fps, 240 fps, etc., depending on embodiment. In at least one embodiment, cameras may be capable of using rolling shutters, global shutters, another type of shutter, or a combination thereof. In at least one embodiment, color filter array may include a red clear clear clear ("RCCC") color filter array, a red clear clear blue ("RCCB") color filter array, a red blue green clear ("RBGC") color filter array, a Foveon X3 color filter array, a Bayer sensors ("RGGB") color filter array, a monochrome sensor color filter array, and/or another type of color filter array. In at least one embodiment, clear pixel cameras, such as cameras with an RCCC, an RCCB, and/or an RBGC color filter array, may be used in an effort to increase light sensitivity.

In at least one embodiment, one or more of camera(s) may be used to perform advanced driver assistance systems ("ADAS") functions (e.g., as part of a redundant or fail-safe design). For example, in at least one embodiment, a Multi-Function Mono Camera may be installed to provide functions including lane departure warning, traffic sign assist and intelligent headlamp control. In at least one embodiment, one or more of camera(s) (e.g., all of cameras) may record and provide image data (e.g., video) simultaneously.

In at least one embodiment, one or more of cameras may be mounted in a mounting assembly, such as a custom designed (three-dimensional ("3D") printed) assembly, in order to cut out stray light and reflections from within car (e.g., reflections from dashboard reflected in windshield mirrors) which may interfere with camera's image data capture abilities. With reference to wing-mirror mounting assemblies, in at least one embodiment, wing-mirror assemblies may be custom 3D printed so that camera mounting plate matches shape of wing-mirror. In at least one embodiment, camera(s) may be integrated into wing-mirror. For side-view cameras, camera(s) may also be integrated within four pillars at each corner.

In at least one embodiment, cameras with a field of view that include portions of environment in front of vehicle 1000 (e.g., front-facing cameras) may be used for surround view, to help identify forward facing paths and obstacles, as well as aid in, with help of one or more of controllers 1036 and/or control SoCs, providing information critical to generating an occupancy grid and/or determining preferred vehicle paths. In at least one embodiment, front-facing cameras may be used to perform many of same ADAS functions as LIDAR, including, without limitation, emergency braking, pedestrian detection, and collision avoidance. In at least one embodiment, front-facing cameras may also be used for ADAS functions and systems including, without limitation, Lane Departure Warnings ("LDW"), Autonomous Cruise Control ("ACC"), and/or other functions such as traffic sign recognition.

In at least one embodiment, a variety of cameras may be used in a front-facing configuration, including, for example, a monocular camera platform that includes a CMOS ("complementary metal oxide semiconductor") color imager. In at least one embodiment, wide-view camera 1070 may be used to perceive objects coming into view from periphery (e.g., pedestrians, crossing traffic or bicycles). Although only one wide-view camera 1070 is illustrated in FIG. 10B, in other embodiments, there may be any number (including zero) of wide-view camera(s) 1070 on vehicle 1000. In at least one embodiment, any number of long-range camera(s) 1098 (e.g., a long-view stereo camera pair) may be used for depth-based object detection, especially for objects for which a neural network has not yet been trained. In at least one embodiment, long-range camera(s) 1098 may also be used for object detection and classification, as well as basic object tracking.

In at least one embodiment, any number of stereo camera(s) 1068 may also be included in a front-facing configuration. In at least one embodiment, one or more of stereo camera(s) 1068 may include an integrated control unit comprising a scalable processing unit, which may provide a programmable logic ("FPGA") and a multi-core microprocessor with an integrated Controller Area Network ("CAN") or Ethernet interface on a single chip. In at least one embodiment, such a unit may be used to generate a 3D map of environment of vehicle 1000, including a distance estimate for all points in image. In at least one embodiment, one or more of stereo camera(s) 1068 may include, without limitation, compact stereo vision sensor(s) that may include, without limitation, two camera lenses (one each on left and right) and an image processing chip that may measure distance from vehicle 1000 to target object and use generated information (e.g., metadata) to activate autonomous emergency braking and lane departure warning functions. In at least one embodiment, other types of stereo camera(s) 1068 may be used in addition to, or alternatively from, those described herein.

In at least one embodiment, cameras with a field of view that include portions of environment to side of vehicle 1000 (e.g., side-view cameras) may be used for surround view, providing information used to create and update occupancy grid, as well as to generate side impact collision warnings. For example, in at least one embodiment, surround camera(s) 1074 (e.g., four surround cameras 1074 as illustrated in FIG. 10B) could be positioned on vehicle 1000. In at least one embodiment, surround camera(s) 1074 may include, without limitation, any number and combination of wide-view camera(s) 1070, fisheye camera(s), 360 degree camera(s), and/or like. For instance, in at least one embodiment, four fisheye cameras may be positioned on front, rear, and sides of vehicle 1000. In at least one embodiment, vehicle 1000 may use three surround camera(s) 1074 (e.g., left, right, and rear), and may leverage one or more other camera(s) (e.g., a forward-facing camera) as a fourth surround-view camera.

In at least one embodiment, cameras with a field of view that include portions of environment to rear of vehicle 1000 (e.g., rear-view cameras) may be used for park assistance, surround view, rear collision warnings, and creating and updating occupancy grid. In at least one embodiment, a wide variety of cameras may be used including, but not limited to, cameras that are also suitable as a front-facing camera(s)

(e.g., long-range cameras 1098 and/or mid-range camera(s) 1076, stereo camera(s) 1068), infrared camera(s) 1072, etc.), as described herein.

Communication engine and coalescing agent logic 904 are used to perform automatic coalescing of communication requests over a network. Details regarding communication engine and coalescing agent logic 904 are provided above with respect to FIGS. 1-8. In at least one embodiment, communication engine and coalescing agent logic 904 may be used in system FIG. 10B for automatic coalescing operations for computing systems using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Figure 10C:
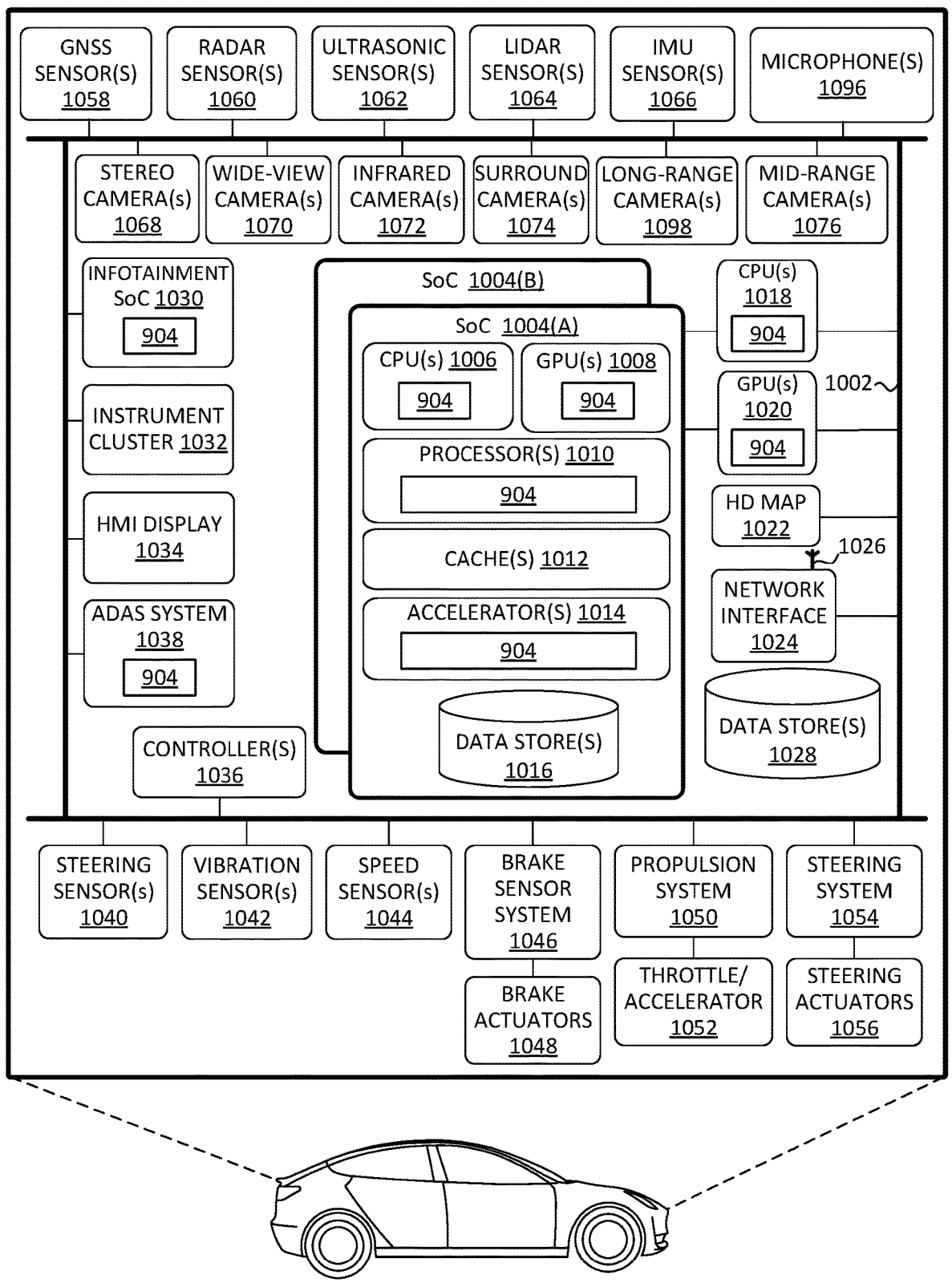
FIG. 10C illustrates an example system architecture for the autonomous vehicle of FIG. 10A, according to at least one embodiment.

FIG. 10C is a block diagram illustrating an example system architecture for autonomous vehicle 1000 of FIG. 10A, according to at least one embodiment. In at least one embodiment, each of components, features, and systems of vehicle 1000 in FIG. 10C are illustrated as being connected via a bus 1002. In at least one embodiment, bus 1002 may include, without limitation, a CAN data interface (alternatively referred to herein as a "CAN bus"). In at least one embodiment, a CAN bus may be a network inside vehicle 1000 used to aid in control of various features and functionality of vehicle 1000, such as actuation of brakes, acceleration, braking, steering, windshield wipers, etc. In at least one embodiment, bus 1002 may be configured to have dozens or even hundreds of nodes, each with its own unique identifier (e.g., a CAN ID). In at least one embodiment, bus 1002 may be read to find steering wheel angle, ground speed, engine revolutions per minute ("RPMs"), button positions, and/or other vehicle status indicators. In at least one embodiment, bus 1002 may be a CAN bus that is ASIL B compliant.

In at least one embodiment, in addition to, or alternatively from CAN, FlexRay and/or Ethernet may be used. In at least one embodiment, there may be any number of busses 1002, which may include, without limitation, zero or more CAN busses, zero or more FlexRay busses, zero or more Ethernet busses, and/or zero or more other types of busses using a different protocol. In at least one embodiment, two or more busses 1002 may be used to perform different functions, and/or may be used for redundancy. For example, a first bus 1002 may be used for collision avoidance functionality and a second bus 1002 may be used for actuation control. In at least one embodiment, each bus 1002 may communicate with any of components of vehicle 1000, and two or more busses 1002 may communicate with same components. In at least one embodiment, each of any number of system(s) on chip(s) ("SoC(s)") 1004, each of controller(s) 1036, and/or each computer within vehicle may have access to same input data (e.g., inputs from sensors of vehicle 1000), and may be connected to a common bus, such CAN bus.

In at least one embodiment, vehicle 1000 may include one or more controller(s) 1036, such as those described herein with respect to FIG. 10A. Controller(s) 1036 may be used for a variety of functions. In at least one embodiment, controller(s) 1036 may be coupled to any of various other components and systems of vehicle 1000, and may be used for control of vehicle 1000, artificial intelligence of vehicle 1000, infotainment for vehicle 1000, and/or like.

In at least one embodiment, vehicle 1000 may include any number of SoCs 1004. Each of SoCs 1004 may include, without limitation, central processing units ("CPU(s)") 1006, graphics processing units ("GPU(s)") 1008, processor(s) 1010, cache(s) 1012, accelerator(s) 1014, data store(s) 1010, and/or other components and features not illustrated. In at least one embodiment, SoC(s) 1004 may be used to control vehicle 1000 in a variety of platforms and systems. For example, in at least one embodiment, SoC(s) 1004 may be combined in a system (e.g., system of vehicle 1000) with a High Definition ("HD") map 1022 which may obtain map refreshes and/or updates via network interface 1024 from one or more servers (not shown in FIG. 10C).

In at least one embodiment, CPU(s) 1006 may include a CPU cluster or CPU complex (alternatively referred to herein as a "CCPLEX"). In at least one embodiment, CPU(s) 1006 may include multiple cores and/or level two ("L2") caches. For instance, in at least one embodiment, CPU(s) 1006 may include eight cores in a coherent multi-processor configuration. In at least one embodiment, CPU(s) 1006 may include four dual-core clusters where each cluster has a dedicated L2 cache (e.g., a 2 MB L2 cache). In at least one embodiment, CPU(s) 1006 (e.g., CCPLEX) may be configured to support simultaneous cluster operation enabling any combination of clusters of CPU(s) 1006 to be active at any given time.

In at least one embodiment, one or more of CPU(s) 1006 may implement power management capabilities that include, without limitation, one or more of following features: individual hardware blocks may be clock-gated automatically when idle to save dynamic power; each core clock may be gated when core is not actively executing instructions due to execution of Wait for Interrupt ("WFI")/Wait for Event ("WFE") instructions; each core may be independently power-gated; each core cluster may be independently clock-gated when all cores are clock-gated or power-gated; and/or each core cluster may be independently power-gated when all cores are power-gated. In at least one embodiment, CPU(s) 1006 may further implement an enhanced algorithm for managing power states, where allowed power states and expected wakeup times are specified, and hardware/microcode determines best power state to enter for core, cluster, and CCPLEX. In at least one embodiment, processing cores may support simplified power state entry sequences in software with work offloaded to microcode.

In at least one embodiment, GPU(s) 1008 may include an integrated GPU (alternatively referred to herein as an "iGPU"). In at least one embodiment, GPU(s) 1008 may be programmable and may be efficient for parallel workloads. In at least one embodiment, GPU(s) 1008, in at least one embodiment, may use an enhanced tensor instruction set. In at least one embodiment, GPU(s) 1008 may include one or more streaming microprocessors, where each streaming microprocessor may include a level one ("L1") cache (e.g., an L1 cache with at least 96 KB storage capacity), and two or more of streaming microprocessors may share an L2 cache (e.g., an L2 cache with a 512 KB storage capacity). In at least one embodiment, GPU(s) 1008 may include at least eight streaming microprocessors. In at least one embodiment, GPU(s) 1008 may use compute application programming interface(s) (API(s)). In at least one embodiment, GPU(s) 1008 may use one or more parallel computing platforms and/or programming models (e.g., NVIDIA's CUDA).

In at least one embodiment, one or more of GPU(s) 1008 may be power-optimized for best performance in automotive and embedded use cases. For example, in on embodiment, GPU(s) 1008 could be fabricated on a Fin field-effect transistor ("FinFET"). In at least one embodiment, each streaming microprocessor may incorporate a number of mixed-precision processing cores partitioned into multiple blocks. For example, and without limitation, 64 PF32 cores and 32 PF64 cores could be partitioned into four processing blocks. In at least one embodiment, each processing block could be allocated 10 FP32 cores, 8 FP64 cores, 10 INT32 cores, two mixed-precision NVIDIA TENSOR COREs for deep learning matrix arithmetic, a level zero ("L0") instruction cache, a warp scheduler, a dispatch unit, and/or a 64 KB register file. In at least one embodiment, streaming microprocessors may include independent parallel integer and floating-point data paths to provide for efficient execution of workloads with a mix of computation and addressing calculations. In at least one embodiment, streaming microprocessors may include independent thread scheduling capability to enable finer-grain synchronization and cooperation between parallel threads. In at least one embodiment, streaming microprocessors may include a combined L1 data cache and shared memory unit in order to improve performance while simplifying programming.

In at least one embodiment, one or more of GPU(s) 1008 may include a high bandwidth memory ("HBM") and/or a 10 GB HBM2 memory subsystem to provide, in some examples, about 900 GB/second peak memory bandwidth. In at least one embodiment, in addition to, or alternatively from, HBM memory, a synchronous graphics random-access memory ("SGRAM") may be used, such as a graphics double data rate type five synchronous random-access memory ("GDDR5").

In at least one embodiment, GPU(s) 1008 may include unified memory technology. In at least one embodiment, address translation services ("ATS") support may be used to allow GPU(s) 1008 to access CPU(s) 1006 page tables directly. In at least one embodiment, embodiment, when GPU(s) 1008 memory management unit ("MMU") experiences a miss, an address translation request may be transmitted to CPU(s) 1006. In response, CPU(s) 1006 may look in its page tables for virtual-to-physical mapping for address and transmits translation back to GPU(s) 1008, in at least one embodiment. In at least one embodiment, unified memory technology may allow a single unified virtual address space for memory of both CPU(s) 1006 and GPU(s) 1008, thereby simplifying GPU(s) 1008 programming and porting of applications to GPU(s) 1008.

In at least one embodiment, GPU(s) 1008 may include any number of access counters that may keep track of frequency of access of GPU(s) 1008 to memory of other processors. In at least one embodiment, access counter(s) may help ensure that memory pages are moved to physical memory of processor that is accessing pages most frequently, thereby improving efficiency for memory ranges shared between processors.

In at least one embodiment, one or more of SoC(s) 1004 may include any number of cache(s) 1012, including those described herein. For example, in at least one embodiment, cache(s) 1012 could include a level three ("L3") cache that is available to both CPU(s) 1006 and GPU(s) 1008 (e.g., that is connected both CPU(s) 1006 and GPU(s) 1008). In at least one embodiment, cache(s) 1012 may include a write-back cache that may keep track of states of lines, such as by using a cache coherence protocol (e.g., MEI, MESI, MSI, etc.). In at least one embodiment, L3 cache may include 4 MB or more, depending on embodiment, although smaller cache sizes may be used.

In at least one embodiment, one or more of SoC(s) 1004 may include one or more accelerator(s) 1014 (e.g., hardware accelerators, software accelerators, or a combination thereof). In at least one embodiment, SoC(s) 1004 may include a hardware acceleration cluster that may include optimized hardware accelerators and/or large on-chip memory. In at least one embodiment, large on-chip memory (e.g., 4 MB of SRAM), may enable hardware acceleration cluster to accelerate neural networks and other calculations. In at least one embodiment, hardware acceleration cluster may be used to complement GPU(s) 1008 and to off-load some of tasks of GPU(s) 1008 (e.g., to free up more cycles of GPU(s) 1008 for performing other tasks). In at least one embodiment, accelerator(s) 1014 could be used for targeted workloads (e.g., perception, convolutional neural networks ("CNNs"), recurrent neural networks ("RNNs"), etc.) that are stable enough to be amenable to acceleration. In at least one embodiment, a CNN may include a region-based or regional convolutional neural networks ("RCNNs") and Fast RCNNs (e.g., as used for object detection) or other type of CNN.

In at least one embodiment, accelerator(s) 1014 (e.g., hardware acceleration cluster) may include a deep learning accelerator(s) ("DLA(s)"). DLA(s) may include, without limitation, one or more Tensor processing units ("TPU(s)") that may be configured to provide an additional ten trillion operations per second for deep learning applications and inferencing. In at least one embodiment, TPU(s) may be accelerators configured to, and optimized for, performing image processing functions (e.g., for CNNs, RCNNs, etc.). DLA(s) may further be optimized for a specific set of neural network types and floating point operations, as well as inferencing. In at least one embodiment, design of DLA(s) may provide more performance per millimeter than a typical general-purpose GPU, and typically vastly exceeds performance of a CPU. In at least one embodiment, TPU(s) may perform several functions, including a single-instance convolution function, supporting, for example, INT8, INT16, and FP16 data types for both features and weights, as well as post-processor functions. In at least one embodiment, DLA(s) may quickly and efficiently execute neural networks, especially CNNs, on processed or unprocessed data for any of a variety of functions, including, for example and without limitation: a CNN for object identification and detection using data from camera sensors; a CNN for distance estimation using data from camera sensors; a CNN for emergency vehicle detection and identification and detection using data from microphones 1096; a CNN for facial recognition and vehicle owner identification using data from camera sensors; and/or a CNN for security and/or safety related events.

In at least one embodiment, DLA(s) may perform any function of GPU(s) 1008, and by using an inference accelerator, for example, a designer may target either DLA(s) or GPU(s) 1008 for any function. For example, in at least one embodiment, designer may focus processing of CNNs and floating point operations on DLA(s) and leave other functions to GPU(s) 1008 and/or other accelerator(s) 1014.

In at least one embodiment, accelerator(s) 1014 (e.g., hardware acceleration cluster) may include a programmable vision accelerator(s) ("PVA"), which may alternatively be referred to herein as a computer vision accelerator. In at least one embodiment, PVA(s) may be designed and configured to accelerate computer vision algorithms for advanced driver assistance system ("ADAS") 1038, autonomous driving, augmented reality ("AR") applications, and/or virtual reality ("VR") applications. PVA(s) may provide a balance between performance and flexibility. For example, in at least one embodiment, each PVA(s) may include, for example and without limitation, any number of reduced instruction set computer ("RISC") cores, direct memory access ("DMA"), and/or any number of vector processors.

In at least one embodiment, RISC cores may interact with image sensors (e.g., image sensors of any of cameras described herein), image signal processor(s), and/or like. In at least one embodiment, each of RISC cores may include any amount of memory. In at least one embodiment, RISC cores may use any of a number of protocols, depending on embodiment. In at least one embodiment, RISC cores may execute a real-time operating system ("RTOS"). In at least one embodiment, RISC cores may be implemented using one or more integrated circuit devices, application specific integrated circuits ("ASICs"), and/or memory devices. For example, in at least one embodiment, RISC cores could include an instruction cache and/or a tightly coupled RAM.

In at least one embodiment, DMA may enable components of PVA(s) to access system memory independently of CPU(s) 1006. In at least one embodiment, DMA may support any number of features used to provide optimization to PVA including, but not limited to, supporting multi-dimensional addressing and/or circular addressing. In at least one embodiment, DMA may support up to six or more dimensions of addressing, which may include, without limitation, block width, block height, block depth, horizontal block stepping, vertical block stepping, and/or depth stepping.

In at least one embodiment, vector processors may be programmable processors that may be designed to efficiently and flexibly execute programming for computer vision algorithms and provide signal processing capabilities. In at least one embodiment, PVA may include a PVA core and two vector processing subsystem partitions. In at least one embodiment, PVA core may include a processor subsystem, DMA engine(s) (e.g., two DMA engines), and/or other peripherals. In at least one embodiment, vector processing subsystem may operate as primary processing engine of PVA, and may include a vector processing unit ("VPU"), an instruction cache, and/or vector memory (e.g., "VMEM"). In at least one embodiment, VPU may include a digital signal processor such as, for example, a single instruction, multiple data ("SIMD"), very long instruction word ("VLIW") digital signal processor. In at least one embodiment, a combination of SIMD and VLIW may enhance throughput and speed.

In at least one embodiment, each of vector processors may include an instruction cache and may be coupled to dedicated memory. As a result, in at least one embodiment, each of vector processors may be configured to execute independently of other vector processors. In at least one embodiment, vector processors that are included in a particular PVA may be configured to employ data parallelism. For instance, in at least one embodiment, plurality of vector processors included in a single PVA may execute same computer vision algorithm, but on different regions of an image. In at least one embodiment, vector processors included in a particular PVA may simultaneously execute different computer vision algorithms, on same image, or even execute different algorithms on sequential images or portions of an image. In at least one embodiment, among other things, any number of PVAs may be included in hardware acceleration cluster and any number of vector processors may be included in each of PVAs. In at least one embodiment, PVA(s) may include additional error correcting code ("ECC") memory, to enhance overall system safety.

In at least one embodiment, accelerator(s) 1014 (e.g., hardware acceleration cluster) may include a computer vision network on-chip and static random-access memory ("SRAM"), for providing a high-bandwidth, low latency SRAM for accelerator(s) 1014. In at least one embodiment, on-chip memory may include at least 4 MB SRAM, consisting of, for example and without limitation, eight field-configurable memory blocks, that may be accessible by both PVA and DLA. In at least one embodiment, each pair of memory blocks may include an advanced peripheral bus ("APB") interface, configuration circuitry, a controller, and a multiplexer. In at least one embodiment, any type of memory may be used. In at least one embodiment, PVA and DLA may access memory via a backbone that provides PVA and DLA with high-speed access to memory. In at least one embodiment, backbone may include a computer vision network on-chip that interconnects PVA and DLA to memory (e.g., using APB).

In at least one embodiment, computer vision network on-chip may include an interface that determines, before transmission of any control signal/address/data, that both PVA and DLA provide ready and valid signals. In at least one embodiment, an interface may provide for separate phases and separate channels for transmitting control signals/addresses/data, as well as burst-type communications for continuous data transfer. In at least one embodiment, an interface may comply with International Organization for Standardization ("ISO") 26262 or International Electrotechnical Commission ("IEC") 61508 standards, although other standards and protocols may be used.

In at least one embodiment, one or more of SoC(s) 1004 may include a real-time ray-tracing hardware accelerator. In at least one embodiment, real-time ray-tracing hardware accelerator may be used to quickly and efficiently determine positions and extents of objects (e.g., within a world model), to generate real-time visualization simulations, for RADAR signal interpretation, for sound propagation synthesis and/or analysis, for simulation of SONAR systems, for general wave propagation simulation, for comparison to LIDAR data for purposes of localization and/or other functions, and/or for other uses.

In at least one embodiment, accelerator(s) 1014 (e.g., hardware accelerator cluster) have a wide array of uses for autonomous driving. In at least one embodiment, PVA may be a programmable vision accelerator that may be used for key processing stages in ADAS and autonomous vehicles. In at least one embodiment, PVA's capabilities are a good match for algorithmic domains needing predictable processing, at low power and low latency. In other words, PVA performs well on semi-dense or dense regular computation, even on small data sets, which need predictable run-times with low latency and low power. In at least one embodiment, autonomous vehicles, such as vehicle 1000, PVAs are designed to run classic computer vision algorithms, as they are efficient at object detection and operating on integer math.

For example, according to at least one embodiment of technology, PVA is used to perform computer stereo vision. In at least one embodiment, semi-global matching-based algorithm may be used in some examples, although this is not intended to be limiting. In at least one embodiment, applications for Level 3-5 autonomous driving use motion estimation/stereo matching on-the-fly (e.g., structure from motion, pedestrian recognition, lane detection, etc.). In at least one embodiment, PVA may perform computer stereo vision function on inputs from two monocular cameras.

In at least one embodiment, PVA may be used to perform dense optical flow. For example, in at least one embodiment, PVA could process raw RADAR data (e.g., using a 4D Fast Fourier Transform) to provide processed RADAR data. In at least one embodiment, PVA is used for time of flight depth processing, by processing raw time of flight data to provide processed time of flight data, for example.

In at least one embodiment, DLA may be used to run any type of network to enhance control and driving safety, including for example and without limitation, a neural network that outputs a measure of confidence for each object detection. In at least one embodiment, confidence may be represented or interpreted as a probability, or as providing a relative "weight" of each detection compared to other detections. In at least one embodiment, confidence enables a system to make further decisions regarding which detections should be considered as true positive detections rather than false positive detections. For example, In at least one embodiment, a system may set a threshold value for confidence and consider only detections exceeding threshold value as true positive detections. In an embodiment in which an automatic emergency braking ("AEB") system is used, false positive detections would cause vehicle to automatically perform emergency braking, which is obviously undesirable. In at least one embodiment, highly confident detections may be considered as triggers for AEB. In at least one embodiment, DLA may run a neural network for regressing confidence value. In at least one embodiment, neural network may take as its input at least some subset of parameters, such as bounding box dimensions, ground plane estimate obtained (e.g. from another subsystem), output from IMU sensor(s) 1066 that correlates with vehicle 1000 orientation, distance, 3D location estimates of object obtained from neural network and/or other sensors (e.g., LIDAR sensor(s) 1064 or RADAR sensor(s) 1060), among others.

In at least one embodiment, one or more of SoC(s) 1004 may include data store(s) 1016 (e.g., memory). In at least one embodiment, data store(s) 1016 may be on-chip memory of SoC(s) 1004, which may store neural networks to be executed on GPU(s) 1008 and/or DLA. In at least one embodiment, data store(s) 1016 may be large enough in capacity to store multiple instances of neural networks for redundancy and safety. In at least one embodiment, data store(s) 1016 may comprise L2 or L3 cache(s).

In at least one embodiment, one or more of SoC(s) 1004 may include any number of processor(s) 1010 (e.g., embedded processors). In at least one embodiment, processor(s) 1010 may include a boot and power management processor that may be a dedicated processor and subsystem to handle boot power and management functions and related security enforcement. In at least one embodiment, boot and power management processor may be a part of SoC(s) 1004 boot sequence and may provide runtime power management services. In at least one embodiment, boot power and management processor may provide clock and voltage programming, assistance in system low power state transitions, management of SoC(s) 1004 thermals and temperature sensors, and/or management of SoC(s) 1004 power states. In at least one embodiment, each temperature sensor may be implemented as a ring-oscillator whose output frequency is proportional to temperature, and SoC(s) 1004 may use ring-oscillators to detect temperatures of CPU(s) 1006, GPU(s) 1008, and/or accelerator(s) 1014. In at least one embodiment, if temperatures are determined to exceed a threshold, then boot and power management processor may enter a temperature fault routine and put SoC(s) 1004 into a lower power state and/or put vehicle 1000 into a chauffeur to safe stop mode (e.g., bring vehicle 1000 to a safe stop).

In at least one embodiment, processor(s) 1010 may further include a set of embedded processors that may serve as an audio processing engine. In at least one embodiment, audio processing engine may be an audio subsystem that enables full hardware support for multi-channel audio over multiple interfaces, and a broad and flexible range of audio I/O interfaces. In at least one embodiment, audio processing engine is a dedicated processor core with a digital signal processor with dedicated RAM.

In at least one embodiment, processor(s) 1010 may further include an always on processor engine that may provide necessary hardware features to support low power sensor management and wake use cases. In at least one embodiment, always on processor engine may include, without limitation, a processor core, a tightly coupled RAM, supporting peripherals (e.g., timers and interrupt controllers), various I/O controller peripherals, and routing logic.

In at least one embodiment, processor(s) 1010 may further include a safety cluster engine that includes, without limitation, a dedicated processor subsystem to handle safety management for automotive applications. In at least one embodiment, safety cluster engine may include, without limitation, two or more processor cores, a tightly coupled RAM, support peripherals (e.g., timers, an interrupt controller, etc.), and/or routing logic. In a safety mode, two or more cores may operate, in at least one embodiment, in a lockstep mode and function as a single core with comparison logic to detect any differences between their operations. In at least one embodiment, processor(s) 1010 may further include a real-time camera engine that may include, without limitation, a dedicated processor subsystem for handling real-time camera management. In at least one embodiment, processor(s) 1010 may further include a high-dynamic range signal processor that may include, without limitation, an image signal processor that is a hardware engine that is part of camera processing pipeline.

In at least one embodiment, processor(s) 1010 may include a video image compositor that may be a processing block (e.g., implemented on a microprocessor) that implements video post-processing functions needed by a video playback application to produce final image for player window. In at least one embodiment, video image compositor may perform lens distortion correction on wide-view camera(s) 1070, surround camera(s) 1074, and/or on in-cabin monitoring camera sensor(s). In at least one embodiment, in-cabin monitoring camera sensor(s) are preferably monitored by a neural network running on another instance of SoC(s) 1004, configured to identify in cabin events and respond accordingly. In at least one embodiment, an in-cabin system may perform, without limitation, lip reading to activate cellular service and place a phone call, dictate emails, change vehicle's destination, activate or change vehicle's infotainment system and settings, or provide voice-activated web surfing. In at least one embodiment, certain functions are available to driver when vehicle is operating in an autonomous mode and are disabled otherwise.

In at least one embodiment, video image compositor may include enhanced temporal noise reduction for both spatial and temporal noise reduction. For example, in at least one embodiment, where motion occurs in a video, noise reduction weights spatial information appropriately, decreasing weight of information provided by adjacent frames. In at least one embodiment, where an image or portion of an image does not include motion, temporal noise reduction performed by video image compositor may use information from previous image to reduce noise in current image.

In at least one embodiment, video image compositor may also be configured to perform stereo rectification on input stereo lens frames. In at least one embodiment, video image compositor may further be used for user interface composition when operating system desktop is in use, and GPU(s) 1008 are not required to continuously render new surfaces. In at least one embodiment, when GPU(s) 1008 are powered on and active doing 3D rendering, video image compositor may be used to offload GPU(s) 1008 to improve performance and responsiveness.

In at least one embodiment, one or more of SoC(s) 1004 may further include a mobile industry processor interface ("MIPI") camera serial interface for receiving video and input from cameras, a high-speed interface, and/or a video input block that may be used for camera and related pixel input functions. In at least one embodiment, one or more of SoC(s) 1004 may further include an input/output controller (s) that may be controlled by software and may be used for receiving I/O signals that are uncommitted to a specific role.

In at least one embodiment, one or more of SoC(s) 1004 may further include a broad range of peripheral interfaces to enable communication with peripherals, audio encoders/decoders ("codecs"), power management, and/or other devices. SoC(s) 1004 may be used to process data from cameras (e.g., connected over Gigabit Multimedia Serial Link and Ethernet), sensors (e.g., LIDAR sensor(s) 1064, RADAR sensor(s) 1060, etc. that may be connected over Ethernet), data from bus 1002 (e.g., speed of vehicle 1000, steering wheel position, etc.), data from GNSS sensor(s) 1058 (e.g., connected over Ethernet or CAN bus), etc. In at least one embodiment, one or more of SoC(s) 1004 may further include dedicated high-performance mass storage controllers that may include their own DMA engines, and that may be used to free CPU(s) 1006 from routine data management tasks.

In at least one embodiment, SoC(s) 1004 may be an end-to-end platform with a flexible architecture that spans automation levels 3-5, thereby providing a comprehensive functional safety architecture that leverages and makes efficient use of computer vision and ADAS techniques for diversity and redundancy, provides a platform for a flexible, reliable driving software stack, along with deep learning tools. In at least one embodiment, SoC(s) 1004 may be faster, more reliable, and even more energy-efficient and space-efficient than conventional systems. For example, in at least one embodiment, accelerator(s) 1014, when combined with CPU(s) 1006, GPU(s) 1008, and data store(s) 1016, may provide for a fast, efficient platform for level 3-5 autonomous vehicles.

In at least one embodiment, computer vision algorithms may be executed on CPUs, which may be configured using high-level programming language, such as C programming language, to execute a wide variety of processing algorithms across a wide variety of visual data. However, in at least one embodiment, CPUs are oftentimes unable to meet performance requirements of many computer vision applications, such as those related to execution time and power consumption, for example. In at least one embodiment, many CPUs are unable to execute complex object detection algorithms in real-time, which are used in in-vehicle ADAS applications and in practical Level 3-5 autonomous vehicles.

Embodiments described herein allow for multiple neural networks to be performed simultaneously and/or sequentially, and for results to be combined together to enable Level 3-5 autonomous driving functionality. For example, in at least one embodiment, a CNN executing on DLA or discrete GPU (e.g., GPU(s) 1020) may include text and word recognition, allowing supercomputer to read and understand traffic signs, including signs for which neural network has not been specifically trained. In at least one embodiment, DLA may further include a neural network that is able to identify, interpret, and provide semantic understanding of sign, and to pass that semantic understanding to path planning modules running on CPU Complex.

In at least one embodiment, multiple neural networks may be run simultaneously, as for Level 3, 4, or 5 driving. For example, in at least one embodiment, a warning sign consisting of "Caution: flashing lights indicate icy conditions," along with an electric light, may be independently or collectively interpreted by several neural networks. In at least one embodiment, a sign itself may be identified as a traffic sign by a first deployed neural network (e.g., a neural network that has been trained) and a text "flashing lights indicate icy conditions" may be interpreted by a second deployed neural network, which informs vehicle's path planning software (preferably executing on CPU Complex) that when flashing lights are detected, icy conditions exist. In at least one embodiment, a flashing light may be identified by operating a third deployed neural network over multiple frames, informing vehicle's path-planning software of presence (or absence) of flashing lights. In at least one embodiment, all three neural networks may run simultaneously, such as within DLA and/or on GPU(s) 1008.

In at least one embodiment, a CNN for facial recognition and vehicle owner identification may use data from camera sensors to identify presence of an authorized driver and/or owner of vehicle 1000. In at least one embodiment, an always on sensor processing engine may be used to unlock vehicle when owner approaches driver door and turn on lights, and, in security mode, to disable vehicle when owner leaves vehicle. In this way, SoC(s) 1004 provide for security against theft and/or carjacking.

In at least one embodiment, a CNN for emergency vehicle detection and identification may use data from microphones 1096 to detect and identify emergency vehicle sirens. In at least one embodiment, SoC(s) 1004 use CNN for classifying environmental and urban sounds, as well as classifying visual data. In at least one embodiment, CNN running on DLA is trained to identify relative closing speed of emergency vehicle (e.g., by using Doppler effect). In at least one embodiment, CNN may also be trained to identify emergency vehicles specific to local area in which vehicle is operating, as identified by GNSS sensor(s) 1058. In at least one embodiment, when operating in Europe, CNN will seek to detect European sirens, and when in United States CNN will seek to identify only North American sirens. In at least one embodiment, once an emergency vehicle is detected, a control program may be used to execute an emergency vehicle safety routine, slowing vehicle, pulling over to side of road, parking vehicle, and/or idling vehicle, with assistance of ultrasonic sensor(s) 1062, until emergency vehicle (s) passes.

In at least one embodiment, vehicle 1000 may include CPU(s) 1018 (e.g., discrete CPU(s), or dCPU(s)), that may be coupled to SoC(s) 1004 via a high-speed interconnect (e.g., PCIe). In at least one embodiment, CPU(s) 1018 may include an X86 processor, for example. CPU(s) 1018 may be used to perform any of a variety of functions, including arbitrating potentially inconsistent results between ADAS sensors and SoC(s) 1004, and/or monitoring status and health of controller(s) 1036 and/or an infotainment system on a chip ("infotainment SoC") 1030, for example.

In at least one embodiment, vehicle 1000 may include GPU(s) 1020 (e.g., discrete GPU(s), or dGPU(s)), that may be coupled to SoC(s) 1004 via a high-speed interconnect (e.g., NVIDIA's NVLINK). In at least one embodiment, GPU(s) 1020 may provide additional artificial intelligence functionality, such as by executing redundant and/or different neural networks, and may be used to train and/or update neural networks based at least in part on input (e.g., sensor data) from sensors of vehicle 1000.

In at least one embodiment, vehicle 1000 may further include network interface 1024 which may include, without limitation, wireless antenna(s) 1026 (e.g., one or more wireless antennas 1026 for different communication protocols, such as a cellular antenna, a Bluetooth antenna, etc.). In at least one embodiment, network interface 1024 may be used to enable wireless connectivity over Internet with cloud (e.g., with server(s) and/or other network devices), with other vehicles, and/or with computing devices (e.g., client devices of passengers). In at least one embodiment, to communicate with other vehicles, a direct link may be established between vehicle 1000 and other vehicle and/or an indirect link may be established (e.g., across networks and over Internet). In at least one embodiment, direct links may be provided using a vehicle-to-vehicle communication link. vehicle-to-vehicle communication link may provide vehicle 1000 information about vehicles in proximity to vehicle 1000 (e.g., vehicles in front of, on side of, and/or behind vehicle 1000). In at least one embodiment, aforementioned functionality may be part of a cooperative adaptive cruise control functionality of vehicle 1000.

In at least one embodiment, network interface 1024 may include an SoC that provides modulation and demodulation functionality and enables controller(s) 1036 to communicate over wireless networks. In at least one embodiment, network interface 1024 may include a radio frequency front-end for up-conversion from baseband to radio frequency, and down conversion from radio frequency to baseband. In at least one embodiment, frequency conversions may be performed in any technically feasible fashion. For example, frequency conversions could be performed through well-known processes, and/or using super-heterodyne processes. In at least one embodiment, radio frequency front end functionality may be provided by a separate chip. In at least one embodiment, network interface may include wireless functionality for communicating over LTE, WCDMA, UMTS, GSM, CDMA2000, Bluetooth, Bluetooth LE, Wi-Fi, Z-Wave, ZigBee, LoRaWAN, and/or other wireless protocols.

In at least one embodiment, vehicle 1000 may further include data store(s) 1028 which may include, without limitation, off-chip (e.g., off SoC(s) 1004) storage. In at least one embodiment, data store(s) 1028 may include, without limitation, one or more storage elements including RAM, SRAM, dynamic random-access memory ("DRAM"), video random-access memory ("VRAM"), Flash, hard disks, and/or other components and/or devices that may store at least one bit of data.

In at least one embodiment, vehicle 1000 may further include GNSS sensor(s) 1058 (e.g., GPS and/or assisted GPS sensors), to assist in mapping, perception, occupancy grid generation, and/or path planning functions. In at least one embodiment, any number of GNSS sensor(s) 1058 may be used, including, for example and without limitation, a GPS using a USB connector with an Ethernet to Serial (e.g., RS-232) bridge.

In at least one embodiment, vehicle 1000 may further include RADAR sensor(s) 1060. RADAR sensor(s) 1060 may be used by vehicle 1000 for long-range vehicle detection, even in darkness and/or severe weather conditions. In at least one embodiment, RADAR functional safety levels may be ASIL B. RADAR sensor(s) 1060 may use CAN and/or bus 1002 (e.g., to transmit data generated by RADAR sensor(s) 1060) for control and to access object tracking data, with access to Ethernet to access raw data in some examples. In at least one embodiment, wide variety of RADAR sensor types may be used. For example, and without limitation, RADAR sensor(s) 1060 may be suitable for front, rear, and side RADAR use. In at least one embodiment, one or more of RADAR sensors(s) 1060 are Pulse Doppler RADAR sensor(s).

In at least one embodiment, RADAR sensor(s) 1060 may include different configurations, such as long-range with narrow field of view, short-range with wide field of view, short-range side coverage, etc. In at least one embodiment, long-range RADAR may be used for adaptive cruise control functionality. In at least one embodiment, long-range RADAR systems may provide a broad field of view realized by two or more independent scans, such as within a 250 m range. In at least one embodiment, RADAR sensor(s) 1060 may help in distinguishing between static and moving objects, and may be used by ADAS system 1038 for emergency brake assist and forward collision warning. Sensors 1060(*s*) included in a long-range RADAR system may include, without limitation, monostatic multimodal RADAR with multiple (e.g., six or more) fixed RADAR antennae and a high-speed CAN and FlexRay interface. In at least one embodiment, with six antennae, central four antennae may create a focused beam pattern, designed to record vehicle 1000's surroundings at higher speeds with minimal interference from traffic in adjacent lanes. In at least one embodiment, other two antennae may expand field of view, making it possible to quickly detect vehicles entering or leaving vehicle 1000's lane.

In at least one embodiment, mid-range RADAR systems may include, as an example, a range of up to 160 m (front) or 80 m (rear), and a field of view of up to 42 degrees (front) or 150 degrees (rear). In at least one embodiment, short-range RADAR systems may include, without limitation, any number of RADAR sensor(s) 1060 designed to be installed at both ends of rear bumper. When installed at both ends of rear bumper, in at least one embodiment, a RADAR sensor system may create two beams that constantly monitor blind spot in rear and next to vehicle. In at least one embodiment, short-range RADAR systems may be used in ADAS system 1038 for blind spot detection and/or lane change assist.

In at least one embodiment, vehicle 1000 may further include ultrasonic sensor(s) 1062. Ultrasonic sensor(s) 1062, which may be positioned at front, back, and/or sides of vehicle 1000, may be used for park assist and/or to create and update an occupancy grid. In at least one embodiment, a wide variety of ultrasonic sensor(s) 1062 may be used, and different ultrasonic sensor(s) 1062 may be used for different ranges of detection (e.g., 2.5 m, 4 m). In at least one embodiment, ultrasonic sensor(s) 1062 may operate at functional safety levels of ASIL B.

In at least one embodiment, vehicle 1000 may include LIDAR sensor(s) 1064. LIDAR sensor(s) 1064 may be used for object and pedestrian detection, emergency braking, collision avoidance, and/or other functions. In at least one embodiment, LIDAR sensor(s) 1064 may be functional safety level ASIL B. In at least one embodiment, vehicle 1000 may include multiple LIDAR sensors 1064 (e.g., two, four, six, etc.) that may use Ethernet (e.g., to provide data to a Gigabit Ethernet switch).

In at least one embodiment, LIDAR sensor(s) 1064 may be capable of providing a list of objects and their distances for a 360-degree field of view. In at least one embodiment, commercially available LIDAR sensor(s) 1064 may have an advertised range of approximately 100 m, with an accuracy of 2 cm-3 cm, and with support for a 100 Mbps Ethernet connection, for example. In at least one embodiment, one or more non-protruding LIDAR sensors 1064 may be used. In such an embodiment, LIDAR sensor(s) 1064 may be implemented as a small device that may be embedded into front, rear, sides, and/or corners of vehicle 1000. In at least one embodiment, LIDAR sensor(s) 1064, in such an embodiment, may provide up to a 120-degree horizontal and 35-degree vertical field-of-view, with a 200 m range even for low-reflectivity objects. In at least one embodiment, front-mounted LIDAR sensor(s) 1064 may be configured for a horizontal field of view between 45 degrees and 135 degrees.

In at least one embodiment, LIDAR technologies, such as 3D flash LIDAR, may also be used. 3D Flash LIDAR uses a flash of a laser as a transmission source, to illuminate surroundings of vehicle 1000 up to approximately 200 m. In at least one embodiment, a flash LIDAR unit includes, without limitation, a receptor, which records laser pulse transit time and reflected light on each pixel, which in turn corresponds to range from vehicle 1000 to objects. In at least one embodiment, flash LIDAR may allow for highly accurate and distortion-free images of surroundings to be generated with every laser flash. In at least one embodiment, four flash LIDAR sensors may be deployed, one at each side of vehicle 1000. In at least one embodiment, 3D flash LIDAR systems include, without limitation, a solid-state 3D staring array LIDAR camera with no moving parts other than a fan (e.g., a non-scanning LIDAR device). In at least one embodiment, flash LIDAR device(s) may use a 5 nanosecond class I (eye-safe) laser pulse per frame and may capture reflected laser light in form of 3D range point clouds and co-registered intensity data.

In at least one embodiment, vehicle may further include IMU sensor(s) 1066. In at least one embodiment, IMU sensor(s) 1066 may be located at a center of rear axle of vehicle 1000, in at least one embodiment. In at least one embodiment, IMU sensor(s) 1066 may include, for example and without limitation, accelerometer(s), magnetometer(s), gyroscope(s), magnetic compass(es), and/or other sensor types. In at least one embodiment, such as in six-axis applications, IMU sensor(s) 1066 may include, without limitation, accelerometers and gyroscopes. In at least one embodiment, such as in nine-axis applications, IMU sensor(s) 1066 may include, without limitation, accelerometers, gyroscopes, and magnetometers.

In at least one embodiment, IMU sensor(s) 1066 may be implemented as a miniature, high performance GPS-Aided Inertial Navigation System ("GPS/INS") that combines micro-electro-mechanical systems ("MEMS") inertial sensors, a high-sensitivity GPS receiver, and advanced Kalman filtering algorithms to provide estimates of position, velocity, and attitude. In at least one embodiment, IMU sensor(s) 1066 may enable vehicle 1000 to estimate heading without requiring input from a magnetic sensor by directly observing and correlating changes in velocity from GPS to IMU sensor(s) 1066. In at least one embodiment, IMU sensor(s) 1066 and GNSS sensor(s) 1058 may be combined in a single integrated unit.

In at least one embodiment, vehicle 1000 may include microphone(s) 1096 placed in and/or around vehicle 1000. In at least one embodiment, microphone(s) 1096 may be used for emergency vehicle detection and identification, among other things.

In at least one embodiment, vehicle 1000 may further include any number of camera types, including stereo camera(s) 1068, wide-view camera(s) 1070, infrared camera(s) 1072, surround camera(s) 1074, long-range camera(s) 1098, mid-range camera(s) 1076, and/or other camera types. In at least one embodiment, cameras may be used to capture image data around an entire periphery of vehicle 1000. In at least one embodiment, types of cameras used depends on vehicle 1000. In at least one embodiment, any combination of camera types may be used to provide necessary coverage around vehicle 1000. In at least one embodiment, number of cameras may differ depending on embodiment. For example, in at least one embodiment, vehicle 1000 could include six cameras, seven cameras, ten cameras, twelve cameras, or another number of cameras. Cameras may support, as an example and without limitation, Gigabit Multimedia Serial Link ("GMSL") and/or Gigabit Ethernet. In at least one embodiment, each of camera(s) is described with more detail previously herein with respect to FIG. 10A and FIG. 10B.

In at least one embodiment, vehicle 1000 may further include vibration sensor(s) 1042. In at least one embodiment, vibration sensor(s) 1042 may measure vibrations of components of vehicle 1000, such as axle(s). For example, in at least one embodiment, changes in vibrations may indicate a change in road surfaces. In at least one embodiment, when two or more vibration sensors 1042 are used, differences between vibrations may be used to determine friction or slippage of road surface (e.g., when difference in vibration is between a power-driven axle and a freely rotating axle).

In at least one embodiment, vehicle 1000 may include ADAS system 1038. ADAS system 1038 may include, without limitation, an SoC, in some examples. In at least one embodiment, ADAS system 1038 may include, without limitation, any number and combination of an autonomous/adaptive/automatic cruise control ("ACC") system, a cooperative adaptive cruise control ("CACC") system, a forward crash warning ("FCW") system, an automatic emergency braking ("AEB") system, a lane departure warning ("LDW") system, a lane keep assist ("LKA") system, a blind spot warning ("BSW") system, a rear cross-traffic warning ("RCTW") system, a collision warning ("CW") system, a lane centering ("LC") system, and/or other systems, features, and/or functionality.

In at least one embodiment, ACC system may use RADAR sensor(s) 1060, LIDAR sensor(s) 1064, and/or any number of camera(s). In at least one embodiment, ACC system may include a longitudinal ACC system and/or a lateral ACC system. In at least one embodiment, longitudinal ACC system monitors and controls distance to vehicle immediately ahead of vehicle 1000 and automatically adjust speed of vehicle 1000 to maintain a safe distance from vehicles ahead. In at least one embodiment, lateral ACC system performs distance keeping, and advises vehicle 1000 to change lanes when necessary. In at least one embodiment, lateral ACC is related to other ADAS applications such as LC and CW.

In at least one embodiment, CACC system uses information from other vehicles that may be received via network interface 1024 and/or wireless antenna(s) 1026 from other vehicles via a wireless link, or indirectly, over a network connection (e.g., over Internet). In at least one embodiment, direct links may be provided by a vehicle-to-vehicle ("V2V") communication link, while indirect links may be provided by an infrastructure-to-vehicle ("I2V") communication link. In general, V2V communication concept provides information about immediately preceding vehicles (e.g., vehicles immediately ahead of and in same lane as vehicle 1000), while I2V communication concept provides information about traffic further ahead. In at least one embodiment, CACC system may include either or both I2V and V2V information sources. In at least one embodiment, given information of vehicles ahead of vehicle 1000, CACC system may be more reliable and it has potential to improve traffic flow smoothness and reduce congestion on road.

In at least one embodiment, FCW system is designed to alert driver to a hazard, so that driver may take corrective action. In at least one embodiment, FCW system uses a front-facing camera and/or RADAR sensor(s) 1060, coupled to a dedicated processor, DSP, FPGA, and/or ASIC, that is electrically coupled to driver feedback, such as a display, speaker, and/or vibrating component. In at least one embodiment, FCW system may provide a warning, such as in form of a sound, visual warning, vibration and/or a quick brake pulse.

In at least one embodiment, AEB system detects an impending forward collision with another vehicle or other object, and may automatically apply brakes if driver does not take corrective action within a specified time or distance parameter. In at least one embodiment, AEB system may use front-facing camera(s) and/or RADAR sensor(s) 1060, coupled to a dedicated processor, DSP, FPGA, and/or ASIC. In at least one embodiment, when AEB system detects a hazard, AEB system typically first alerts driver to take corrective action to avoid collision and, if driver does not take corrective action, AEB system may automatically apply brakes in an effort to prevent, or at least mitigate, impact of predicted collision. In at least one embodiment, AEB system, may include techniques such as dynamic brake support and/or crash imminent braking.

In at least one embodiment, LDW system provides visual, audible, and/or tactile warnings, such as steering wheel or seat vibrations, to alert driver when vehicle 1000 crosses lane markings. In at least one embodiment, LDW system does not activate when driver indicates an intentional lane departure, by activating a turn signal. In at least one embodiment, LDW system may use front-side facing cameras, coupled to a dedicated processor, DSP, FPGA, and/or ASIC, that is electrically coupled to driver feedback, such as a display, speaker, and/or vibrating component. In at least one embodiment, LKA system is a variation of LDW system. LKA system provides steering input or braking to correct vehicle 1000 if vehicle 1000 starts to exit lane.

In at least one embodiment, BSW system detects and warns driver of vehicles in an automobile's blind spot. In at least one embodiment, BSW system may provide a visual, audible, and/or tactile alert to indicate that merging or changing lanes is unsafe. In at least one embodiment, BSW system may provide an additional warning when driver uses a turn signal. In at least one embodiment, BSW system may use rear-side facing camera(s) and/or RADAR sensor(s) 1060, coupled to a dedicated processor, DSP, FPGA, and/or ASIC, that is electrically coupled to driver feedback, such as a display, speaker, and/or vibrating component.

In at least one embodiment, RCTW system may provide visual, audible, and/or tactile notification when an object is detected outside rear-camera range when vehicle 1000 is backing up. In at least one embodiment, RCTW system includes AEB system to ensure that vehicle brakes are applied to avoid a crash. In at least one embodiment, RCTW system may use one or more rear-facing RADAR sensor(s) 1060, coupled to a dedicated processor, DSP, FPGA, and/or ASIC, that is electrically coupled to driver feedback, such as a display, speaker, and/or vibrating component.

In at least one embodiment, conventional ADAS systems may be prone to false positive results which may be annoying and distracting to a driver, but typically are not catastrophic, because conventional ADAS systems alert driver and allow driver to decide whether a safety condition truly exists and act accordingly. In at least one embodiment, vehicle 1000 itself decides, in case of conflicting results, whether to heed result from a primary computer or a secondary computer (e.g., first controller 1036 or second controller 1036). For example, in at least one embodiment, ADAS system 1038 may be a backup and/or secondary computer for providing perception information to a backup computer rationality module. In at least one embodiment, backup computer rationality monitor may run a redundant diverse software on hardware components to detect faults in perception and dynamic driving tasks. In at least one embodiment, outputs from ADAS system 1038 may be provided to a supervisory MCU. In at least one embodiment, if outputs from primary computer and secondary computer conflict, supervisory MCU determines how to reconcile conflict to ensure safe operation.

In at least one embodiment, primary computer may be configured to provide supervisory MCU with a confidence score, indicating primary computer's confidence in chosen result. In at least one embodiment, if confidence score exceeds a threshold, supervisory MCU may follow primary computer's direction, regardless of whether secondary computer provides a conflicting or inconsistent result. In at least one embodiment, where confidence score does not meet threshold, and where primary and secondary computer indicate different results (e.g., a conflict), supervisory MCU may arbitrate between computers to determine appropriate outcome.

In at least one embodiment, supervisory MCU may be configured to run a neural network(s) that is trained and configured to determine, based at least in part on outputs from primary computer and secondary computer, conditions under which secondary computer provides false alarms. In at least one embodiment, neural network(s) in supervisory MCU may learn when secondary computer's output may be trusted, and when it cannot. For example, in at least one embodiment, when secondary computer is a RADAR-based FCW system, a neural network(s) in supervisory MCU may learn when FCW system is identifying metallic objects that are not, in fact, hazards, such as a drainage grate or manhole cover that triggers an alarm. In at least one embodiment, when secondary computer is a camera-based LDW system, a neural network in supervisory MCU may learn to override LDW when bicyclists or pedestrians are present and a lane departure is, in fact, safest maneuver. In at least one embodiment, supervisory MCU may include at least one of a DLA or GPU suitable for running neural network(s) with associated memory. In at least one embodiment, supervisory MCU may comprise and/or be included as a component of SoC(s) 1004.

In at least one embodiment, ADAS system 1038 may include a secondary computer that performs ADAS functionality using traditional rules of computer vision. In at least one embodiment, secondary computer may use classic computer vision rules (if-then), and presence of a neural network(s) in supervisory MCU may improve reliability, safety and performance. For example, in at least one embodiment, diverse implementation and intentional non-identity makes overall system more fault-tolerant, especially to faults caused by software (or software-hardware interface) functionality. For example, in at least one embodiment, if there is a software bug or error in software running on primary computer, and non-identical software code running on secondary computer provides same overall result, then supervisory MCU may have greater confidence that overall result is correct, and bug in software or hardware on primary computer is not causing material error.

In at least one embodiment, output of ADAS system 1038 may be fed into primary computer's perception block and/or primary computer's dynamic driving task block. For example, in at least one embodiment, if ADAS system 1038 indicates a forward crash warning due to an object immediately ahead, perception block may use this information when identifying objects. In at least one embodiment, secondary computer may have its own neural network which is trained and thus reduces risk of false positives, as described herein.

In at least one embodiment, vehicle 1000 may further include infotainment SoC 1030 (e.g., an in-vehicle infotainment system (IVI)). Although illustrated and described as an SoC, infotainment system 1030, in at least one embodiment, may not be an SoC, and may include, without limitation, two or more discrete components. In at least one embodiment, infotainment SoC 1030 may include, without limitation, a combination of hardware and software that may be used to provide audio (e.g., music, a personal digital assistant, navigational instructions, news, radio, etc.), video (e.g., TV, movies, streaming, etc.), phone (e.g., hands-free calling), network connectivity (e.g., LTE, WiFi, etc.), and/or information services (e.g., navigation systems, rear-parking assistance, a radio data system, vehicle related information such as fuel level, total distance covered, brake fuel level, oil level, door open/close, air filter information, etc.) to vehicle 1000. For example, infotainment SoC 1030 could include radios, disk players, navigation systems, video players, USB and Bluetooth connectivity, carputers, in-car entertainment, WiFi, steering wheel audio controls, hands free voice control, a heads-up display ("HUD"), HMI display 1034, a telematics device, a control panel (e.g., for controlling and/or interacting with various components, features, and/or systems), and/or other components. In at least one embodiment, infotainment SoC 1030 may further be used to provide information (e.g., visual and/or audible) to user(s) of vehicle, such as information from ADAS system 1038, autonomous driving information such as planned vehicle maneuvers, trajectories, surrounding environment information (e.g., intersection information, vehicle information, road information, etc.), and/or other information.

In at least one embodiment, infotainment SoC 1030 may include any amount and type of GPU functionality. In at least one embodiment, infotainment SoC 1030 may communicate over bus 1002 (e.g., CAN bus, Ethernet, etc.) with other devices, systems, and/or components of vehicle 1000. In at least one embodiment, infotainment SoC 1030 may be coupled to a supervisory MCU such that GPU of infotainment system may perform some self-driving functions in event that primary controller(s) 1036 (e.g., primary and/or backup computers of vehicle 1000) fail. In at least one embodiment, infotainment SoC 1030 may put vehicle 1000 into a chauffeur to safe stop mode, as described herein.

In at least one embodiment, vehicle 1000 may further include instrument cluster 1032 (e.g., a digital dash, an electronic instrument cluster, a digital instrument panel, etc.). In at least one embodiment, instrument cluster 1032 may include, without limitation, a controller and/or supercomputer (e.g., a discrete controller or supercomputer). In at least one embodiment, instrument cluster 1032 may include, without limitation, any number and combination of a set of instrumentation such as a speedometer, fuel level, oil pressure, tachometer, odometer, turn indicators, gearshift position indicator, seat belt warning light(s), parking-brake warning light(s), engine-malfunction light(s), supplemental restraint system (e.g., airbag) information, lighting controls, safety system controls, navigation information, etc. In some examples, information may be displayed and/or shared among infotainment SoC 1030 and instrument cluster 1032. In at least one embodiment, instrument cluster 1032 may be included as part of infotainment SoC 1030, or vice versa.

Communication engine and coalescing agent logic 904 are used to perform automatic coalescing of communication requests over a network. Details regarding communication engine and coalescing agent logic 904 are provided above with respect to FIGS. 1-8. In at least one embodiment, communication engine and coalescing agent logic 904 may be used in system FIG. 10C for automatic coalescing operations for computing systems using neural network training operations, neural network functions and/or architectures, or neural network use cases described herein.

Such components can be used to generate synthetic data imitating failure cases in a network training process, which can help to improve performance of the network while limiting the amount of synthetic data to avoid overfitting.

Figure 10D:
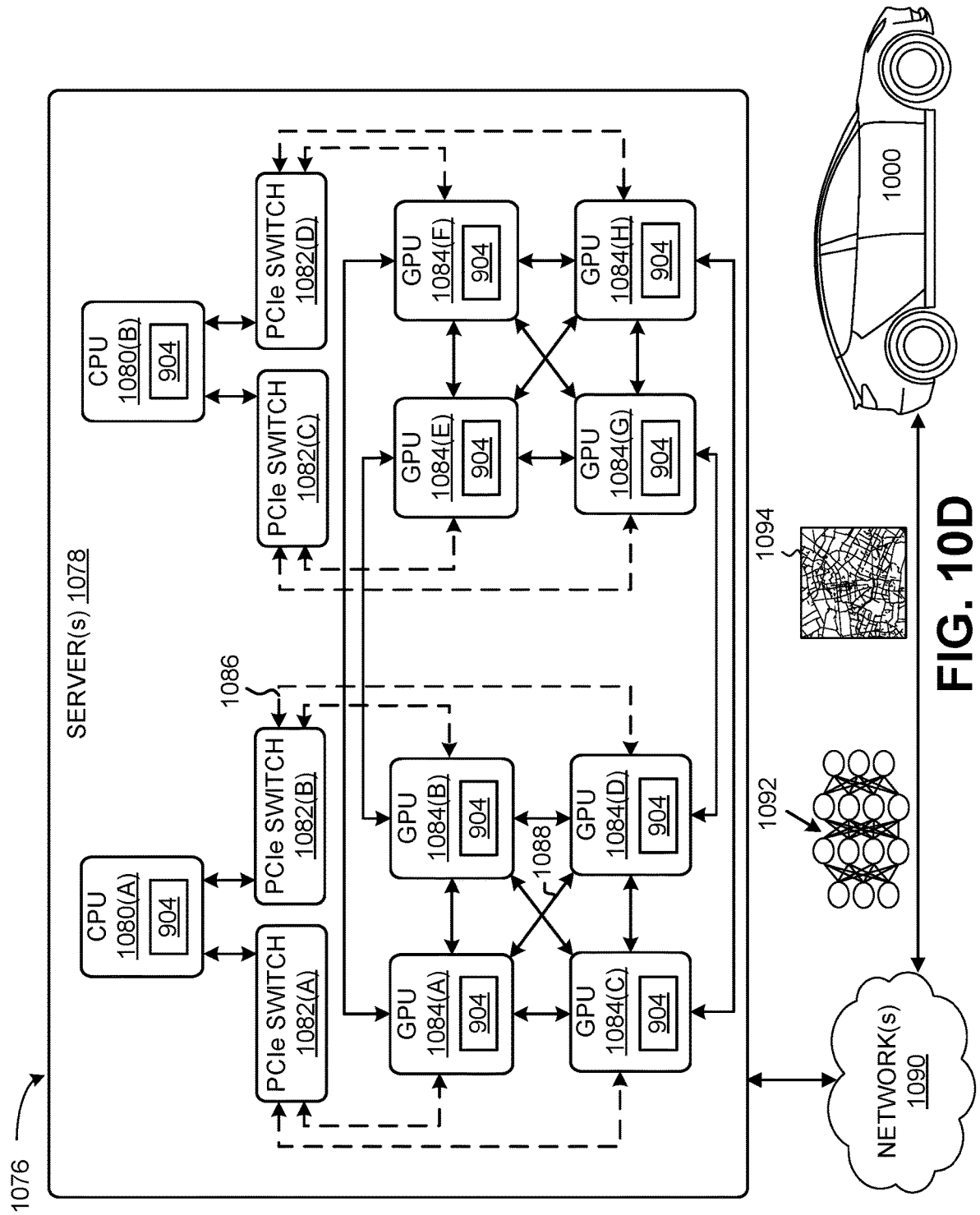
FIG. 10D illustrates a system for communication between cloud-based server(s) and the autonomous vehicle of FIG. 10A, according to at least one embodiment.

FIG. 10D is a diagram of a system 1076 for communication between cloud-based server(s) and autonomous vehicle 1000 of FIG. 10A, according to at least one embodiment. In at least one embodiment, system 1076 may include, without limitation, server(s) 1078, network(s) 1090, and any number and type of vehicles, including vehicle 1000. In at least one embodiment, server(s) 1078 may include, without limitation, a plurality of GPUs 1084(A)-1084(H) (collectively referred to herein as GPUs 1084), PCIe switches 1082(A)-1082(D) (collectively referred to herein as PCIe switches 1082), and/or CPUs 1080(A)-1080(B) (collectively referred to herein as CPUs 1080). GPUs 1084, CPUs 1080, and PCIe switches 1082 may be interconnected with high-speed interconnects such as, for example and without limitation, NVLink interfaces 1088 developed by NVIDIA and/or PCIe connections 1086. In at least one embodiment, GPUs 1084 are connected via an NVLink and/or NVSwitch SoC and GPUs 1084 and PCIe switches 1082 are connected via PCIe interconnects. In at least one embodiment, although eight GPUs 1084, two CPUs 1080, and four PCIe switches 1082 are illustrated, this is not intended to be limiting. In at least one embodiment, each of server(s) 1078 may include, without limitation, any number of GPUs 1084, CPUs 1080, and/or PCIe switches 1082, in any combination. For example, in at least one embodiment, server(s) 1078 could each include eight, sixteen, thirty-two, and/or more GPUs 1084.

In at least one embodiment, server(s) 1078 may receive, over network(s) 1090 and from vehicles, image data representative of images showing unexpected or changed road conditions, such as recently commenced road-work. In at least one embodiment, server(s) 1078 may transmit, over network(s) 1090 and to vehicles, neural networks 1092, updated neural networks 1092, and/or map information 1094, including, without limitation, information regarding traffic and road conditions. In at least one embodiment, updates to map information 1094 may include, without limitation, updates for HD map 1022, such as information regarding construction sites, potholes, detours, flooding, and/or other obstructions. In at least one embodiment, neural networks 1092, updated neural networks 1092, and/or map information 1094 may have resulted from new training and/or experiences represented in data received from any number of vehicles in environment, and/or based at least in part on training performed at a data center (e.g., using server(s) 1078 and/or other servers).

In at least one embodiment, server(s) 1078 may be used to train machine learning models (e.g., neural networks) based at least in part on training data. In at least one embodiment, training data may be generated by vehicles, and/or may be generated in a simulation (e.g., using a game engine). In at least one embodiment, any amount of training data is tagged (e.g., where associated neural network benefits from supervised learning) and/or undergoes other pre-processing. In at least one embodiment, any amount of training data is not tagged and/or pre-processed (e.g., where associated neural network does not require supervised learning). In at least one embodiment, once machine learning models are trained, machine learning models may be used by vehicles (e.g., transmitted to vehicles over network(s) 1090, and/or machine learning models may be used by server(s) 1078 to remotely monitor vehicles.

In at least one embodiment, server(s) 1078 may receive data from vehicles and apply data to up-to-date real-time neural networks for real-time intelligent inferencing. In at least one embodiment, server(s) 1078 may include deep-learning supercomputers and/or dedicated AI computers powered by GPU(s) 1084, such as a DGX and DGX Station machines developed by NVIDIA. However, in at least one embodiment, server(s) 1078 may include deep learning infrastructure that use CPU-powered data centers.

In at least one embodiment, deep-learning infrastructure of server(s) 1078 may be capable of fast, real-time inferencing, and may use that capability to evaluate and verify health of processors, software, and/or associated hardware in vehicle 1000. For example, in at least one embodiment, deep-learning infrastructure may receive periodic updates from vehicle 1000, such as a sequence of images and/or objects that vehicle 1000 has located in that sequence of images (e.g., via computer vision and/or other machine learning object classification techniques). In at least one embodiment, deep-learning infrastructure may run its own neural network to identify objects and compare them with objects identified by vehicle 1000 and, if results do not match and deep-learning infrastructure concludes that AI in vehicle 1000 is malfunctioning, then server(s) 1078 may transmit a signal to vehicle 1000 instructing a fail-safe computer of vehicle 1000 to assume control, notify passengers, and complete a safe parking maneuver.

In at least one embodiment, server(s) 1078 may include GPU(s) 1084 and one or more programmable inference accelerators (e.g., NVIDIA's TensorRT 3). In at least one embodiment, combination of GPU-powered servers and inference acceleration may make real-time responsiveness possible. In at least one embodiment, such as where performance is less critical, servers powered by CPUs, FPGAs, and other processors may be used for inferencing.

Communication engine and coalescing agent logic 904 are used to perform automatic coalescing of communication requests over a network. Details regarding communication engine and coalescing agent logic 904 are provided above with respect to FIGS. 1-8. In at least one embodiment, communication engine and coalescing agent logic 904 may be used in system FIG. 10D for automatic coalescing operations for computing systems using neural network training operations, neural network functions and/or architectures, or neural network use cases described herein.

Computer Systems

Figure 11:
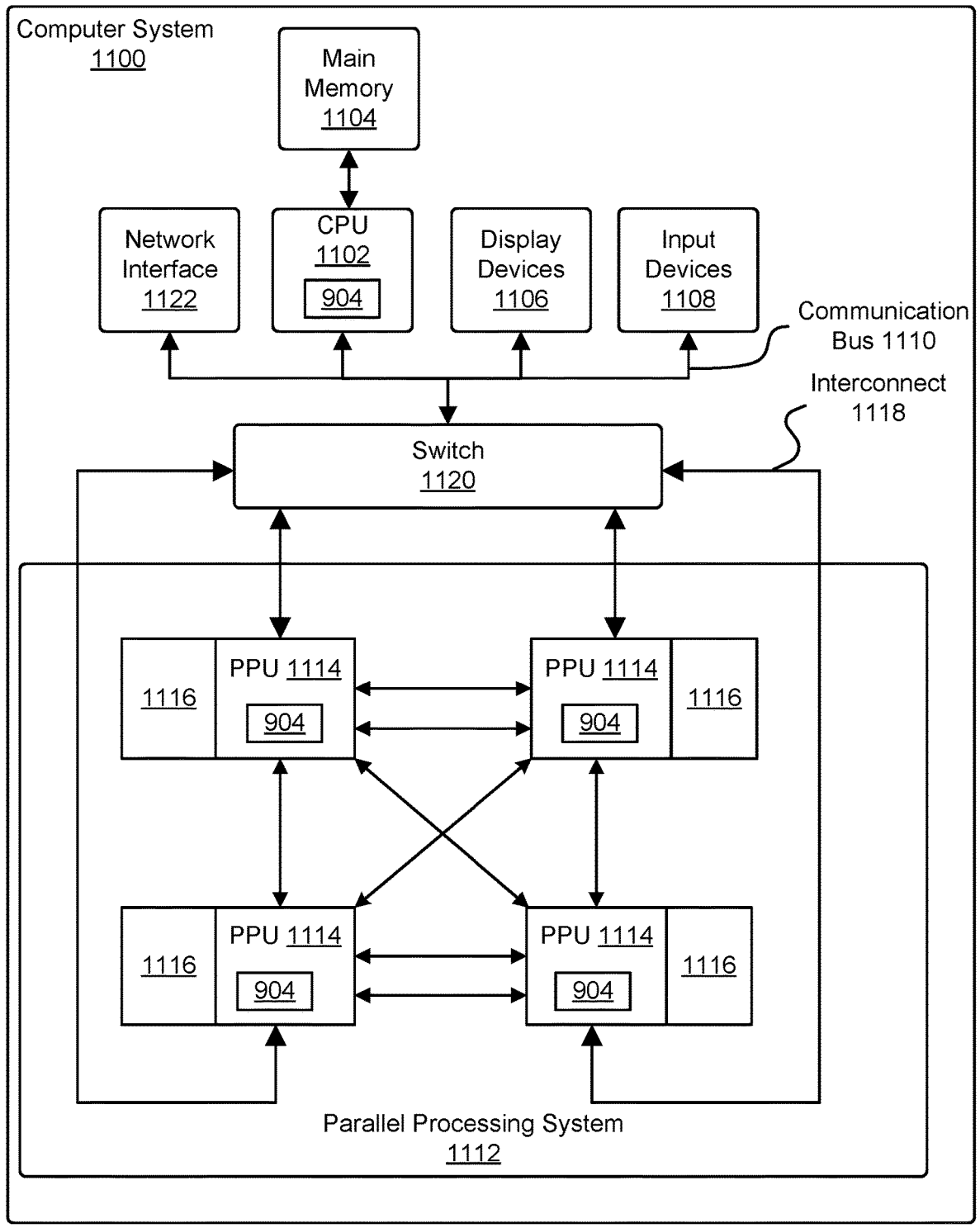
FIG. 11 illustrates a computer system, according to at least one embodiment.

FIG. 11 illustrates a computer system 1100, according to at least one embodiment. In at least one embodiment, computer system 1100 is configured to implement various processes and methods described throughout this disclosure. Communication engine and coalescing agent logic 904 are used to perform automatic coalescing of communication requests over a network via network interface 1122. Details regarding communication engine and coalescing agent logic 904 are provided above with respect to FIGS. 1-8. In at least one embodiment, communication engine and coalescing agent logic 904 may be used in system FIG. 11 for automatic coalescing operations for computing systems using neural network training operations, neural network functions and/or architectures, or neural network use cases described herein.

In at least one embodiment, computer system 1100 comprises, without limitation, at least one central processing unit ("CPU") 1102 that is connected to a communication bus 1110 implemented using any suitable protocol, such as PCI ("Peripheral Component Interconnect"), peripheral component interconnect express ("PCI-Express"), AGP ("Accelerated Graphics Port"), HyperTransport, or any other bus or point-to-point communication protocol(s). In at least one embodiment, computer system 1100 includes, without limitation, a main memory 1104 and control logic (e.g., implemented as hardware, software, or a combination thereof) and data are stored in main memory 1104, which may take form of random access memory ("RAM"). In at least one embodiment, a network interface subsystem ("network interface") 1122 provides an interface to other computing devices and networks for receiving data from and transmitting data to other systems with computer system 1100.

In at least one embodiment, computer system 1100, in at least one embodiment, includes, without limitation, input devices 1108, a parallel processing system 1112, and display devices 1106 that can be implemented using a conventional cathode ray tube ("CRT"), a liquid crystal display ("LCD"), a light emitting diode ("LED") display, a plasma display, or other suitable display technologies. In at least one embodiment, user input is received from input devices 1108 such as keyboard, mouse, touchpad, microphone, etc. In at least one embodiment, each module described herein can be situated on a single semiconductor platform to form a processing system.

Communication engine and coalescing agent logic 904 are used to perform automatic coalescing of communication requests over a network. Details regarding communication engine and coalescing agent logic 904 are provided above with respect to FIGS. 1-8. In at least one embodiment, communication engine and coalescing agent logic 904 may be used in system FIG. 11 for automatic coalescing operations for computing systems using neural network training operations, neural network functions and/or architectures, or neural network use cases described herein.

At least one embodiment of the disclosure can be described in view of the following clauses:

In clause 1, a method comprising: receiving, from a shared memory application executing on a first graphics processing unit (GPU), a first communication request having a second GPU as a destination; determining that the first communication request satisfies a coalescing criterion; storing the first communication request in association with a group of requests that have a common property; determining that a timer associated with the group of requests expires or a size of the group satisfies a group size criterion; coalescing the group of requests into a coalesced request; and transporting the coalesced request to the second GPU over a network.

In clause 2, the method of clause 1, further comprising: receiving, from the shared memory application, a second communication request, wherein the first communication request originates from a first group of threads of the first GPU, and wherein the second communication request originates from a second group of threads of the first GPU; determining that the second communication request satisfies the coalescing criterion; and storing the second communication request in association with the group of requests that have the common property.

In clause 3, the method of clause 1, further comprising: receiving, from the shared memory application, a second communication request having a third GPU as a destination; determining that the second communication request does not satisfy the coalescing criterion, wherein the second communication request is transportable via a peer-to-peer (P2P) connection with the third GPU; and transporting the second communication request to the third GPU over the P2P connection.

In clause 4, the method of clause 1, wherein determining that the first communication request satisfies the coalescing criterion comprises determining that the first communication request satisfies at least one of a request size criterion, a latency criterion, or a peer-to-peer (P2P) connectivity criterion.

In clause 5, the method of clause 1, wherein the common property is at least one of a same operation type, a same network destination, a same GPU destination, or adjacent memory locations.

In clause 6, the method of clause 1, further comprising: receiving, from the shared memory application, a second communication request, wherein the second communication request originates from a group of threads of the first GPU and has a third GPU as a destination; performing group-level coalescing of the second communication request with other communication requests from the group of threads to obtain a group-level request; determining that the group-level request satisfies the coalescing criterion; storing the group-level request in association with a second group of requests that have a common property; determining that a second timer associated with the second group of requests expires or a size of the second group satisfies the group size criterion; coalescing the second group of requests into a second coalesced request; and transporting the second coalesced request to the third GPU.

In clause 7, the method of clause 1, wherein at least one of the receiving, the determining the first communication request satisfied a coalescing criterion, the storing, the determining a timer associated with the group of requests expires or a size of the group satisfies a group size criterion, the coalescing, or the transporting is executed by a software communication engine implemented using the first GPU.

In clause 8, the method of clause 1, wherein at least one of the receiving, the determining the first communication request satisfied a coalescing criterion, the storing, the determining a timer associated with the group of requests expires or a size of the group satisfies a group size criterion, the coalescing, or the transporting is executed by a software communication engine implemented using a first kernel in the first GPU, wherein the shared memory application is executed using a second kernel in the first GPU.

In clause 9, the method of clause 1, wherein at least one of the receiving, the determining the first communication request satisfied a coalescing criterion, the storing, the determining a timer associated with the group of requests expires or a size of the group satisfies a group size criterion, the coalescing, or the transporting is executed by a communication engine implemented as hardware logic using a hardware offload circuit coupled to the first GPU.

In clause 10, the method of clause 1, wherein at least one of the receiving, the determining the first communication request satisfied a coalescing criterion, the storing, the determining a timer associated with the group of requests expires or a size of the group satisfies a group size criterion, the coalescing, or the transporting is executed by a communication engine implemented as a software communication engine using a central processing unit (CPU) operatively coupled to the first GPU.

In clause 11, the method of clause 1, wherein at least one of the receiving, the determining the first communication request satisfied a coalescing criterion, the storing, the determining a timer associated with the group of requests expires or a size of the group satisfies a group size criterion, the coalescing, or the transporting is executed by a communication engine implemented using a software communication engine in a third GPU coupled to the first GPU.

In clause 12, a system comprising: a memory device; a central processing unit (CPU); and a first graphics processing unit (GPU) operatively coupled to the memory device and the CPU, the first GPU to execute a communication engine, wherein the communication engine is to: receive, from a shared memory application, a first communication request having a second GPU as a destination; determine that the first communication request satisfies a coalescing criterion; store the first communication request in association with a group of requests that have a common property; determine that a timer associated with the group of requests expires or a size of the group satisfies a group size criterion; coalesce the group of requests into a coalesced request; and transport the coalesced request to the second GPU over a network.

In clause 13, the system of clause 12, wherein the communication engine is further to: receive, from the shared memory application, a second communication request, wherein the first communication request originates from a first group of threads of the first GPU, and wherein the second communication request originates from a second group of threads of the first GPU; determine that the second communication request satisfies the coalescing criterion; and store the second communication request in association with the group of requests that have the common property.

In clause 14, the system of clause 12, wherein the communication engine is further to: receive, from the shared memory application, a second communication request having a third GPU as a destination; determine that the second communication request does not satisfy the coalescing criterion, wherein the second communication request is transportable via a peer-to-peer (P2P) connection with the third GPU; and transport the second communication request to the third GPU over the P2P connection.

In clause 15, the system of clause 12, wherein the communication engine is to determine that the first communication request satisfies the coalescing criterion by determining that the first communication request satisfies at least one of a request size criterion, a latency criterion, or a peer-to-peer (P2P) connectivity criterion.

In clause 16, the system of clause 12, wherein the common property is at least one of a same operation type, a same network destination, a same GPU destination, or adjacent memory locations.

In clause 17, the system of clause 12, wherein the communication engine is further to: receive, from the shared memory application, a second communication request, wherein the second communication request originates from a group of threads of the first GPU and has a third GPU as a destination; perform group-level coalescing of the second communication request with other communication requests from the group of threads to obtain a group-level request; determine that the group-level request satisfies the coalescing criterion; store the group-level request in association with a second group of requests that have a common property; determine that a second timer associated with the second group of requests expires or a size of the second group satisfies the group size criterion; coalesce the second group of requests into a second coalesced request; and transport the second coalesced request to the third GPU.

In clause 18, a computing system comprising: a memory device; a first graphics processing unit (GPU) operatively coupled to the memory device, the first GPU comprising a communication engine, wherein the communication engine is to: receive, from a shared memory application, a first communication request having a second GPU as a destination; determine that the first communication request satisfies a coalescing criterion; store the first communication request in association with a group of requests that have a common property; determine that a timer associated with the group of requests expires or a size of the group satisfies a group size criterion; coalesce the group of requests into a coalesced request; and transport the coalesced request to the second GPU over a network.

In clause 19, the computing system of clause 18, wherein the communication engine is a hardware offload circuit coupled to the first GPU.

In clause 20, the computing system of clause 18, wherein the first GPU executes the shared memory application and the communication engine.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of term "set" (e.g., "a set of items") or "subset" unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present. In addition, unless otherwise noted or contradicted by context, term "plurality" indicates a state of being plural (e.g., "a plurality of items" indicates multiple items). In at least one embodiment, number of items in a plurality is at least two, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") and/or a data processing unit ("DPU")—potentially in conjunction with a GPU—executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
    receiving, from a shared memory application executing on a first graphics processing unit (GPU), a first communication request having a second GPU as a destination;
    determining whether the first communication request satisfies a coalescing criterion for network transport over a network to the second GPU;
    transporting, in response to determining the first communication request does not satisfy the coalescing criterion, the first communication request to the second GPU over a peer-to-peer (P2P) connection between the first and second GPUs;
    in response to determining the first communication request satisfies the coalescing criterion,
        storing the first communication request in association with a group of requests that have a common property;
        determining that a timer associated with the group of requests expires or a size of the group satisfies a group size criterion;
        coalescing the group of requests into a coalesced request; and
        transporting the coalesced request to the second GPU over the network.

2. The method of claim 1, further comprising:
    receiving, from the shared memory application, a second communication request, wherein the first communication request originates from a first group of threads of the first GPU, and wherein the second communication request originates from a second group of threads of the first GPU;
    determining that the second communication request satisfies the coalescing criterion; and
    storing the second communication request in association with the group of requests that have the common property.

3. The method of claim 1, further comprising:

receiving, from the shared memory application, a second communication request having a third GPU as a destination;

determining that the second communication request does not satisfy the coalescing criterion, wherein the second communication request is transportable via a P2P connection with the third GPU; and transporting the second communication request to the third GPU over the P2P connection.

4. The method of claim 1, wherein determining that the first communication request satisfies the coalescing criterion comprises determining that the first communication request satisfies at least one of a request size criterion, a latency criterion, or a P2P connectivity criterion.

5. The method of claim 1, wherein the common property is at least one of a same operation type, a same network destination, a same GPU destination, or adjacent memory locations.

6. The method of claim 1, further comprising:
receiving, from the shared memory application, a second communication request, wherein the second communication request originates from a group of threads of the first GPU and has a third GPU as a destination;
performing group-level coalescing of the second communication request with other communication requests from the group of threads to obtain a group-level request;
determining that the group-level request satisfies the coalescing criterion;
storing the group-level request in association with a second group of requests that have a common property;
determining that a second timer associated with the second group of requests expires or a size of the second group satisfies the group size criterion;
coalescing the second group of requests into a second coalesced request; and
transporting the second coalesced request to the third GPU.

7. The method of claim 1, wherein at least one of the receiving, the determining the first communication request satisfied a coalescing criterion, the storing, the determining a timer associated with the group of requests expires or a size of the group satisfies a group size criterion, the coalescing, or the transporting is executed by a software communication engine implemented using the first GPU.

8. The method of claim 1, wherein at least one of the receiving, the determining the first communication request satisfied a coalescing criterion, the storing, the determining a timer associated with the group of requests expires or a size of the group satisfies a group size criterion, the coalescing, or the transporting is executed by a software communication engine implemented using a first kernel in the first GPU, wherein the shared memory application is executed using a second kernel in the first GPU.

9. The method of claim 1, wherein at least one of the receiving, the determining the first communication request satisfied a coalescing criterion, the storing, the determining a timer associated with the group of requests expires or a size of the group satisfies a group size criterion, the coalescing, or the transporting is executed by a communication engine implemented as hardware logic using a hardware offload circuit coupled to the first GPU.

10. The method of claim 1, wherein at least one of the receiving, the determining the first communication request satisfied a coalescing criterion, the storing, the determining a timer associated with the group of requests expires or a size of the group satisfies a group size criterion, the coalescing, or the transporting is executed by a communication engine implemented as a software communication engine using a central processing unit (CPU) operatively coupled to the first GPU.

11. The method of claim 1, wherein at least one of the receiving, the determining the first communication request satisfied a coalescing criterion, the storing, the determining a timer associated with the group of requests expires or a size of the group satisfies a group size criterion, the coalescing, or the transporting is executed by a communication engine implemented using a software communication engine in a third GPU coupled to the first GPU.

12. A system comprising:
a memory device;
a central processing unit (CPU); and
a first graphics processing unit (GPU) operatively coupled to the memory device and the CPU, the first GPU to execute a communication engine, wherein the communication engine is to:
receive, from a shared memory application, a first communication request having a second GPU as a destination;
determine whether the first communication request satisfies a coalescing criterion for network transport over a network to the second GPU;
transport, in response to determining the first communication request does not satisfy the coalescing criterion, the first communication request to the second GPU over a peer-to-peer (P2P) connection between the first and second GPUs;
in response to determining the first communication request satisfies the coalescing criterion,
store the first communication request in association with a group of requests that have a common property;
determine that a timer associated with the group of requests expires or a size of the group satisfies a group size criterion;
coalesce the group of requests into a coalesced request; and
transport the coalesced request to the second GPU over the network.

13. The system of claim 12, wherein the communication engine is further to:
receive, from the shared memory application, a second communication request, wherein the first communication request originates from a first group of threads of the first GPU, and wherein the second communication request originates from a second group of threads of the first GPU;
determine that the second communication request satisfies the coalescing criterion; and
store the second communication request in association with the group of requests that have the common property.

14. The system of claim 12, wherein the communication engine is further to:
receive, from the shared memory application, a second communication request having a third GPU as a destination;
determine that the second communication request does not satisfy the coalescing criterion, wherein the second communication request is transportable via the P2P connection with the third GPU; and
transport the second communication request to the third GPU over the P2P connection.

15. The system of claim 12, wherein the communication engine is to determine that the first communication request satisfies the coalescing criterion by determining that the first communication request satisfies at least one of a request size criterion, a latency criterion, or a P2P connectivity criterion.

16. The system of claim 12, wherein the common property is at least one of a same operation type, a same network destination, a same GPU destination, or adjacent memory locations.

17. The system of claim 12, wherein the communication engine is further to:
    receive, from the shared memory application, a second communication request, wherein the second communication request originates from a group of threads of the first GPU and third GPU as a destination;
    perform group-level coalescing of the second communication request with other communication requests from the group of threads to obtain a group-level request;
    determine that the group-level request satisfies the coalescing criterion;
    store the group-level request in association with a second group of requests that have a common property;
    determine that a second timer associated with the second group of requests expires or a size of the second group satisfies the group size criterion;
    coalesce the second group of requests into a second coalesced request; and
    transport the second coalesced request to the third GPU.

18. A computing system comprising:
    a memory device;
    a first graphics processing unit (GPU) operatively coupled to the memory device, the first GPU comprising a communication engine, wherein the communication engine is to:
        receive, from a shared memory application, a first communication request having a second GPU as a destination;
        determine whether the first communication request satisfies a coalescing criterion for network transport over a network to the second GPU;
        transport, in response to determining the first communication request does not satisfy the coalescing criterion, the first communication request to the second GPU over a peer-to-peer (P2P) connection between the first and second GPUs;
        in response to determining the first communication request satisfies the coalescing criterion,
            store the first communication request in association with a group of requests that have a common property;
            determine that a timer associated with the group of requests expires or a size of the group satisfies a group size criterion;
            coalesce the group of requests into a coalesced request; and
            transport the coalesced request to the second GPU over the network.

19. The computing system of claim 18, wherein the communication engine is a hardware offload circuit coupled to the first GPU.

20. The computing system of claim 18, wherein the first GPU executes the shared memory application and the communication engine.

* * * * *